United States Patent
Gorantla

(10) Patent No.: US 11,908,075 B2
(45) Date of Patent: Feb. 20, 2024

(54) GENERATING AND FILTERING NAVIGATIONAL MAPS

(71) Applicant: Valeo Schalter und Sensoren GmbH, Bietigheim-Bissingen (DE)

(72) Inventor: Sree Harsha Chowdary Gorantla, Sunnyvale, CA (US)

(73) Assignee: VALEO SCHALTER UND SENSOREN GMBH (DE)

( * ) Notice: Subject to any disclaimer, the term of this patent is extended or adjusted under 35 U.S.C. 154(b) by 192 days.

(21) Appl. No.: 17/523,850

(22) Filed: Nov. 10, 2021

(65) Prior Publication Data

US 2023/0146926 A1 May 11, 2023

(51) Int. Cl.
*G01C 21/00* (2006.01)
*G01K 9/00* (2006.01)
(Continued)

(52) U.S. Cl.
CPC ............ *G06T 17/05* (2013.01); *G06T 7/70* (2017.01); *G06V 20/56* (2022.01); *G01C 21/36* (2013.01);
(Continued)

(58) Field of Classification Search
CPC ......... G01S 17/89; G01C 21/00; G01C 21/36; G01C 21/3804; G01C 21/32;
(Continued)

(56) References Cited

U.S. PATENT DOCUMENTS

2019/0271549 A1*  9/2019  Zhang ................. G05D 1/0246
2020/0302241 A1*  9/2020  White ................. G06V 10/772
(Continued)

FOREIGN PATENT DOCUMENTS

DE       102021125234 A1 *  3/2022  ........... G06F 18/214
WO   WO-2022026428 A1 *  2/2022  ............. G06K 9/342

OTHER PUBLICATIONS

A. Y. Hata and D. F. Wolf, "Feature Detection for Vehicle Localization in Urban Environments Using a Multilayer LIDAR," in IEEE Transactions on Intelligent Transportation Systems, vol. 17, No. 2, pp. 420-429, Feb. 2016, doi: 10.1109/TITS.2015.2477817. (Year: 2016).*

(Continued)

*Primary Examiner* — Cuong H Nguyen
(74) *Attorney, Agent, or Firm* — Weaver Austin Villeneuve & Sampson LLP

(57) ABSTRACT

Described are techniques for generating, updating, and using sensor-based navigational maps. An input map is generated based on sensor data captured by a first sensor of a first vehicle. The input map is filtered based on one or more criteria to generate a filtered map corresponding to a three-dimensional representation of a route traveled by the first vehicle. The filtering can be based on detecting features using sensor data captured by a second sensor of the first vehicle. The one or more criteria can include object classes, distance criteria, and/or other criteria relating to attributes of features in the sensor data captured by the first sensor and/or the sensor data captured by the second sensor. The filtered map can be stored for transmission to a second vehicle, for use in determining a location of the second vehicle while the second vehicle is traveling along the same route.

20 Claims, 15 Drawing Sheets

(51) Int. Cl.
   *G06T 17/05* (2011.01)
   *G06T 7/70* (2017.01)
   *G06V 20/56* (2022.01)
   *G01C 21/36* (2006.01)

(52) U.S. Cl.
   CPC .............. *G01C 21/3602* (2013.01); *G06T 2207/10028* (2013.01); *G06T 2207/30252* (2013.01)

(58) Field of Classification Search
   CPC ....... G01C 21/3602; G06T 17/05; G06T 7/70; G06T 2207/10028; G06T 2207/30252; G06V 20/56
   USPC .................................................. 701/420, 421
   See application file for complete search history.

(56) References Cited

U.S. PATENT DOCUMENTS

| | | | | |
|---|---|---|---|---|
| 2021/0383533 | A1* | 12/2021 | Zhao | G06V 20/64 |
| 2022/0306152 | A1* | 9/2022 | Zhang | B60W 30/18159 |
| 2022/0415059 | A1* | 12/2022 | Smolyanskiy | B60W 60/0016 |
| 2023/0087261 | A1* | 3/2023 | Unnikrishnan | G06T 7/20 |
| | | | | 382/100 |

OTHER PUBLICATIONS

S. Kuutti, S. Fallah, K. Katsaros, M. Dianati, F. Mccullough and A. Mouzakitis, "A Survey of the State-of-the-Art Localization Techniques and Their Potentials for Autonomous Vehicle Applications," in IEEE Internet of Things Journal, vol. 5, No. 2, pp. 829-846, Apr. 2018, (Year: 2018).*

H. Tao and X. Lu, "Smoky Vehicle Detection Based on Range Filtering on Three Orthogonal Planes and Motion Orientation Histogram," in IEEE Access, vol. 6, pp. 57180-57190, 2018, doi: 10.1109/ACCESS.2018.2873757 (Year:2018).*

M. Mandal, M. Shah, P. Meena, S. Devi and S. K. Vipparthi, "AVDNet: A Small-Sized Vehicle Detection Network for Aerial Visual Data," in IEEE Geoscience and Remote Sensing Letters, vol. 17, No. 3, pp. 494-498, Mar. 2020, doi: 10.1109/LGRS.2019.2923564 (Year:2020).*

S. Vasavi, N. K. Priyadarshini and K. Harshavaradhan, "Invariant Feature-Based Darknet Architecture for Moving Object Classification," in IEEE Sensors Journal, vol. 21, No. 10, pp. 11417-11426, 15 May 15, 2021, doi: 10.1109/JSEN.2020.3007883 (Year:2021).*

X. Zhao, P. Sun, Z. Xu, H. Min and H. Yu, "Fusion of 3D LIDAR and Camera Data for Object Detection in Autonomous Vehicle Applications," in IEEE Sensors Journal, vol. 20, No. 9, pp. 4901-4913, 1 May 1, 2020, doi: 10.1109/JSEN.2020.2966034 (Year:2020).*

Chabot, F., et al., "Deep Manta: A Coarse-to-fine Many-task Network for Joint 2D and 3D Vehicle Analysis From Monocular Image", Computer Vision and Pattern Recognition, arXiv, Mar. 22, 2017, 10 pages.

International Search Report and Written Opinion dated Feb. 28, 2023 in PCT Application No. PCT/EP2022/081395.

* cited by examiner

GENERATING AND FILTERING NAVIGATIONAL MAPS

BACKGROUND

1. Field of Invention

The present invention relates generally to the field of vehicular navigation and more particularly to the use of sensor data to generate digital maps that can be referenced during navigation to determine vehicle location.

2. Description of Related Art

Navigational maps can be generated in different ways. Some maps are generated through satellite imaging, for use in conjunction with satellite assisted navigation, for example, assistance from a Global Navigation Satellite System such as the Global Positioning System (GPS). Maps generated using satellite imaging tend to be relatively precise and, in conjunction with a satellite receiver on a vehicle, can enable the position or geolocation of the vehicle to be estimated with high accuracy (e.g., accuracy to within several meters or, in some cases, tens of centimeters). However, satellites are not capable of imaging every location since some locations may be obscured from satellite view. Moreover, the availability of satellite assisted navigation may depend on the configuration of a vehicle (e.g., existence of an on-board GPS receiver) as well as environmental factors. For instance, GPS signals may be weak or non-existent when traveling through a tunnel or mountainous terrain.

As an alternative to satellite imaging, maps can be generated using data from sensors such as cameras, Light Detection and Ranging (LIDAR) sensors, and/or radar sensors. Such sensors can provide more detailed information compared to satellite images since the sensors are usually in much closer proximity to the environment being captured. The increased detail level may enable location to be determined with higher precision compared to satellite-based position, for example, accuracy to within one or two centimeters. However, forming a map from sensor data involves processing of a significantly larger quantity of information commensurate with the increase in detail level. Sensor-based maps also tend to contain extraneous information that is unnecessary for determining location. The extraneous information increases map size, requiring additional storage space. Increased map size can also lead to transmission latency when a map is communicated to a vehicle for navigational use.

BRIEF SUMMARY

Embodiments described herein address these and other issues by providing a system and methods for generating concise maps of geographic areas for use in connection with vehicular navigation. Aspects of the present disclosure relate to the generation of maps through capturing sensor data, then filtering the sensor data to remove extraneous information (e.g., data points that meet one or more criteria) using automated processing. The information removed generally corresponds to features that are unnecessary for determining location and that can therefore be classified as being of low or no interest. Examples of features that can be removed without negatively impacting the ability to determine location include vehicles (e.g., a vehicle parked on the side of a street or an oncoming vehicle), animate objects (e.g., pedestrians), and various categories of inanimate objects (e.g., trees). Features that are retained and which are useful for determining location may include, for example, roads, traffic signs, landmarks, or other points of interest.

Automated filtering may involve fusion of data from different types of sensors to identify features for removal. For example, in some implementations, data from a LIDAR or radar sensor is filtered based on features detected using images captured by a camera. Filtering can be performed algorithmically, for example, through a software algorithm configured to apply conditional logic to determine whether one or more criteria associated with the presence of a particular feature are satisfied. In some implementations, machine learning (e.g., a deep learning algorithm or neural network) is used to identify features for removal. For example, deep learning may involve applying a trained machine learning model to determine the physical boundaries of an object belonging to a particular object class or category.

In certain aspects, a method for generating a map involves generating, by a computer system and based on sensor data captured by a first sensor of a first vehicle, an input map corresponding to a three-dimensional representation of a route traveled by the first vehicle. The method further involves filtering, by the computer system and based on one or more criteria, the input map to generate a filtered map. The filtering comprises automatically removing features that satisfy the one or more criteria. The features correspond to objects that are irrelevant to determining a location of a second vehicle with reference to the filtered map. The method further involves transmitting, by the computer system, the filtered map to the second vehicle. The filtered map is processed by a navigation system of the second vehicle to determine a location of the second vehicle while the second vehicle is traveling along the same route.

In certain aspects, a system includes one or more processors and a memory, where the memory stores instructions that are executable by the one or more processors to cause the one or more processors to perform the above-described method for generating a map. The memory can include a non-transitory computer-readable storage medium that stores the instructions.

Figure 1:
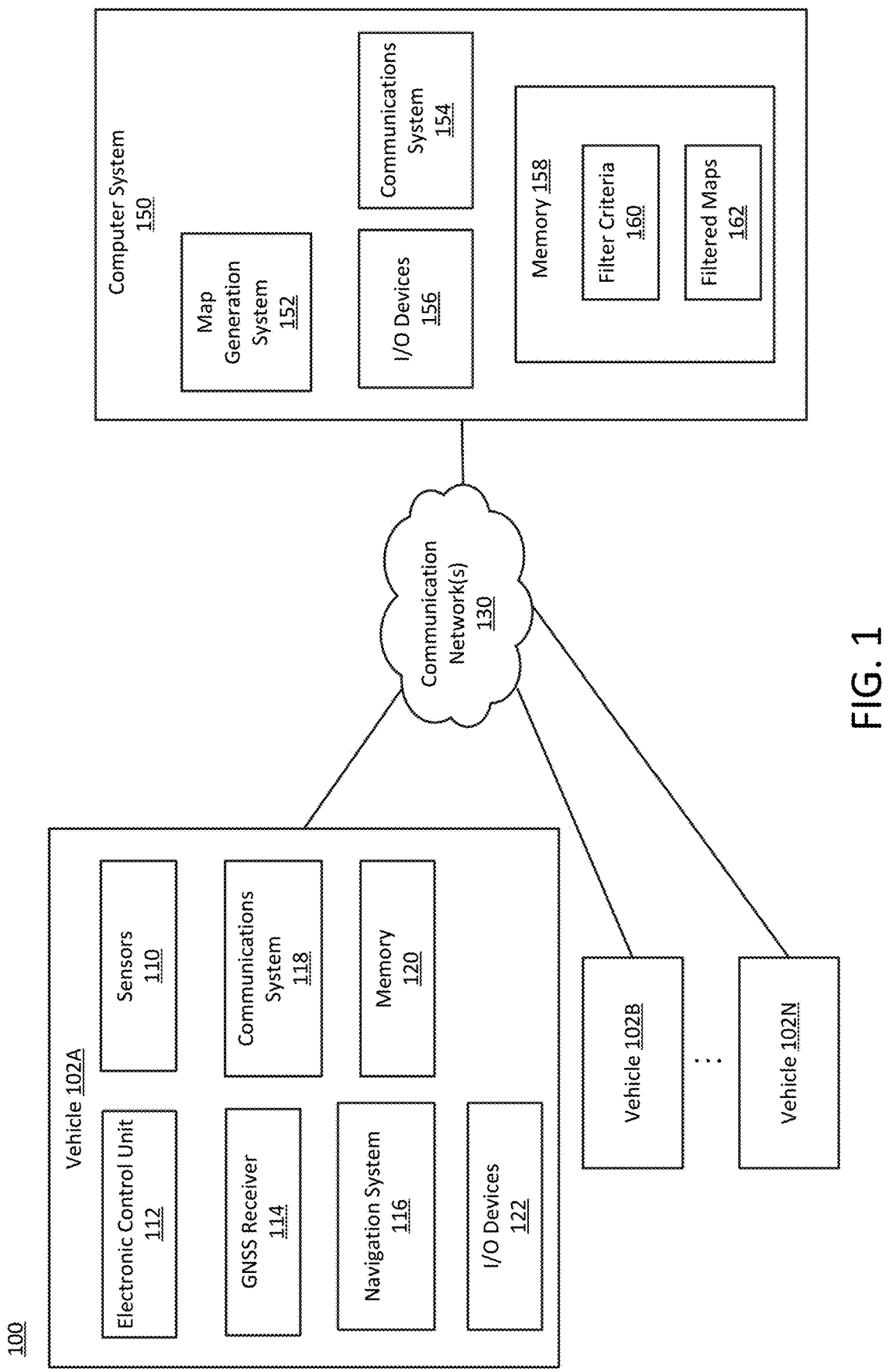
FIG. 1 is a block diagram of a system incorporating one or more embodiments.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110A, 110B, 110C, etc. When referring to such an element using only the first number, any instance of the element is to be understood (e.g., element 110 in the previous example would refer to elements 110-1, 110-2, and 110-3 or to elements 110A, 110B, and 110C).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Aspects of the present disclosure relate to the generation of maps through capturing sensor data and then filtering the sensor data to remove extraneous information, for example, unnecessary data points from a point cloud. Removal of extraneous information may involve subjecting an input map derived from sensor data to automated processing to produce a filtered map that contains less extraneous information. The input map and/or the filtered map can be a two-dimensional (2D) or three-dimensional (3D) representation of a physical environment around a sensor. For example, in some implementations, the input map is a 3D map generated from a LIDAR point cloud, and the output map corresponds to the 3D map after filtering using a 2D image captured by a camera. Accordingly, maps can be generated using 3D representations of physical environments, 2D representations, or a combination of 2D and 3D representations, where the representations are captured by multiple sensors. Automated filtering enables filtered maps to be generated without relying on manual removal of extraneous information. Thus, the filtering techniques described herein can be applied to produce filtered maps in a timelier manner through processing large quantities of sensor data with little or no manual supervision.

A map can be a collection of digital information representing a geographic area. In addition to showing the physical layout of a geographic area, a map usually includes labels identifying locations or features in the geographic area, for example, the name of a road, city, body of water, building, and/or the like. As mentioned above, maps can be 2D or 3D. Accordingly, a location within the geographic area may be specified as a geodetic location expressed using 2D or 3D coordinates (e.g., latitude, longitude, and altitude). Alternatively, a location may be specified as a civic location (e.g. a street address).

Depending on the size of the geographic area, the map may be divided into one or more segments (e.g., square or rectangular tiles), where each segment is formed using sensor data captured by one or more sensors of a vehicle as the vehicle travels through the region corresponding to the segment. In some implementations, the vehicle may be part of an automotive fleet that travels around the geographic area to capture LIDAR point clouds, camera images, and/or other types of representations as part of mapping the geographic area. Thus, a map can be the product of sensor data contributed by at least one vehicle and, in some instances, is generated through aggregation of sensor data from multiple vehicles.

After a map has been filtered to produce a filtered map, the filtered map can be communicated to a vehicle for use as a reference during travel through the geographic area covered by the filtered map. Typically, the vehicle using the filtered map is a different vehicle than the vehicle that supplied sensor data for the input map from which the filtered map was generated. When referencing the filtered map, a vehicle may compare the information in the filtered map to information captured using the vehicle's own sensor(s) in order to determine the vehicle's location. The filtered map can be transferred to a memory of the vehicle for storage. In some instances, the filtered map is pre-loaded onto the memory of the vehicle prior to travel. In other instances, the filtered map is wirelessly transmitted in real-time as the vehicle is traveling through the geographic area covered by the map.

A filtered map can potentially be transmitted all at once, e.g., as a continuous, uninterrupted stream of wireless data. However, in practice, only a portion of a filtered map pertaining to the local region around a vehicle (e.g., one or two segments representing an upcoming region) may be transmitted in a given communication transaction due to bandwidth constraints. Since the filtered map contains less information than the input (unfiltered) map, the filtered map can be transmitted with less latency, helping to ensure that the vehicle has access to map information relevant to the vehicle's current environment. Expedient communication of filtered maps is especially beneficial in situations where satellite assistance is unavailable (e.g., due to lack of GPS signals). For instance, when GPS signals are suddenly lost, a sensor-based map can be streamed to a vehicle as part of switching from GPS positioning to positioning using the sensor-based map. The switch between positioning methods can be made rapidly so that navigation instructions and/or a map displaying the vehicle's location can continue to be presented to a driver with minimal interruption. If the vehicle is an autonomous vehicle, the switch may ensure that a control unit of the autonomous vehicle has substantially uninterrupted access to information about the current location of the autonomous vehicle.

FIG. 1 is a block diagram of a system 100 incorporating one or more embodiments of the present disclosure. The system 100 includes a set of vehicles 102 (e.g., vehicles 102A, 102B, and 102N) and a computer system 150 that is communicatively coupled to the vehicles 102 through one or more communication networks 130.

Network(s) 130 may include any of a variety of public and/or private networks, such as the Internet, one or more cellular networks (e.g., 4G, 5G, or Long Term Evolution (LTE)), a Wi-Fi (IEEE 802.11X) network, a WiMax (Wireless Inter-operability for Microwave Access) network, and/or the like. A vehicle 102 can be wirelessly coupled to a network 130, e.g., via a cellular, Wi-Fi, or Bluetooth connection. In some instances, a vehicle 102 may have a wired (e.g., Ethernet) connection to a network, for example, when transferring sensor data captured by the vehicle to the computer system 150.

As shown in FIG. 1, a vehicle 102 can include sensors 110, an electronic control unit (ECU) 112, a Global Navigation Satellite System (GNSS) receiver 114, a navigation system 116, a communications system 118, a memory 120, and input/output (I/O) devices 122. A vehicle 102 can be an automobile or other type of motor vehicle, for example, a car, a motorcycle, a bus, a truck, etc. However, the techniques described herein are applicable to any sensor-equipped vehicle and are not limited to land-based vehicles. Accordingly, the embodiments disclosed can also be used with watercraft, aircraft, and/or spacecraft.

ECU 112 may include one or more processing units. Each processing unit can be a general-purpose processor, a special-purpose processor (e.g., a digital signal processor (DSP) or a graphics accelerator processor), an application-specific integrated circuit (ASIC), and/or some other hardware circuit or combination of circuits. The ECU 112 may execute instructions stored in memory 120.

Memory 120 may include storage and/or working memory, implemented using volatile storage devices (e.g., RAM), non-volatile storage devices (e.g., ROM), or a combination of volatile and non-volatile storage. Memory 120 may, for example, store program code corresponding to a software application that is executable by ECU 112 to generate and filter a map. Additionally or alternatively, the memory 120 may store a software application that is executable by ECU 112 to obtain and process a filtered map in connection with determining the location of the vehicle 102. Further, the memory 120 may include storage space for sensor data captured by one or more of the sensors 110 in connection with generating a filtered map and/or using a filtered map to determine location. Thus, the memory 120 may include storage for program instructions that are executable to configure the ECU 112 and/or other vehicle components (e.g., the sensors 110) to provide various map-related functionality described herein.

Sensors 110 can include one or more instances of a camera, a LIDAR sensor, a radar sensor, an ultrasonic sensor, and/or other type of sensor capable of capturing data from which a 2D or 3D representation of the environment around the sensor can be formed. For example, a front-facing camera may be installed behind a windshield of vehicle 102A to capture a 2D image of the environment in front of the vehicle 102A, whereas a LIDAR or radar sensor may produce a 3D point cloud representing the environment in front of the vehicle 102. Each sensor has a corresponding field of view. Multiple instances of a sensor can be employed to capture the environment in different directions (e.g., sensors mounted on the sides or rear of the vehicle). A vehicle 102 may be configured to perform sensor fusion as part of generating an input map and/or a filtered map. For example, a composite image can be formed by stitching together images from cameras that are pointed in different directions. In a stereo camera arrangement, an image from a first camera and an image from a second camera may be combined to generate a 3D representation based on knowledge regarding the positions of the first and second cameras, e.g., through comparing both images to extract depth information based on camera disparity. Accordingly, an input map can be generated through combining data from different sensors.

Sensor fusion may involve data from different types of sensors. The sensor data provided by one type of sensor may supplement and, in some instances, overlap with the sensor data provided by another type of sensor. For example, a LIDAR sensor may generate a point cloud that contains points representing the contour of a road, and a camera may capture an image of the same road, where the image includes lane markers that are not detectable by LIDAR (e.g., because the lane markers are painted, not 3D). Thus, different sensors and/or different types of sensors may contribute to a more comprehensive view of the environment around a vehicle 102. Examples of using data from a first sensor type to filter data from a second sensor type are described below.

GNSS receiver 114 is configured to communicate with one or more satellites of a GNSS. For example, GNSS receiver 114 may include a GPS receiver that can be tuned to a carrier frequency of a signal from a satellite in a GPS constellation. GNSS receiver 114 can have transmission capabilities as well, for example, to request assistance information from a land-based server in connection with determining the location of the GNSS receiver 114. When used in connection with GNSS-based positioning, the GNSS receiver 114 may receive reference signals from multiple satellites, and the reference signals may be processed (e.g., by navigation system 116) to determine the location of the vehicle 102 geometrically, for example, through trilateration. In some instances, GNSS-based positioning may involve communication with a terrestrial entity such as a base station or another GNSS receiver. For example, the location of the vehicle 102 may be determined using information broadcasted from nearby base stations at known locations, where the information from the base stations includes reference signals and/or measurements of GPS signals received by the base stations.

Navigation system 116 is configured to access maps stored in memory 120 in connection with determining the position of vehicle 102. The process of determining a vehicle's position in relation to a map may be referred to as "localization" and, when performed using a sensor-based map, may involve comparing data captured by one or more sensors 110 to data contained in the sensor-based map. For example, by comparing a point cloud captured by a LIDAR or radar sensor to a point cloud included in the sensor-based map, navigation system 116 may determine that the vehicle 102 is currently positioned at a specific portion of a road. The comparison may involve matching features contained in real-time sensor data to corresponding features contained in a sensor-based map. For instance, the navigation system 116 may identify features (e.g., the contour of a road or the outline of a building) from the points in a real-time point cloud and determine whether there are matching features in the sensor-based map.

The navigation system 116 can be implemented in software and/or hardware. For instance, navigation system 116 may be a software application residing in the memory 120 and executed by a processor of the ECU 112. The navigation system 116 may determine the location of the vehicle 102 in connection with providing navigational guidance to a driver of the vehicle 102. For instance, navigation system 116 may use the location of the vehicle 102 to plan a route to a driver specified destination, show the vehicle's location on a display inside the vehicle, or obtain traffic notifications or other reports relating to the vehicle's location from a remote server. Similarly, if the vehicle 102 is an autonomous vehicle, the location of the vehicle can be provided as an input for determining an autonomous action (e.g., a driving maneuver) designed to bring the vehicle to the driver specified destination or for determining whether a planned autonomous action should be modified in light of traffic, weather, hazards, or other conditions that exist around the vehicle's location.

Communications system 118 can include a wireless communications interface through which data is communicated between vehicle 102 and computer system 150. Accordingly, the communications system 118 can include radio-frequency components such as a Wi-Fi receiver, a cellular receiver, and/or the like. A radio-frequency component operating as a receiver may also include transmission capabilities. Radio-frequency components may share hardware. For example, communications system 118 can include an antenna array that includes one or more antennas used by the GNSS receiver 114 to receive signals from a GPS satellite and one or more antennas configured to receive signals from a cellular base station. In some implementations, separate antennas may be provided for use with different wireless communication protocols. For example, GNSS receiver 114 may include its own antenna array separate from the antenna array of a radio-frequency receiver in the communications system 118.

The navigation system 116 may be configured to request a sensor-based map using the communications system 118. The request for the sensor-based map can be sent to the computer system 150 to cause the computer system 150 to transmit the sensor-based map or a relevant portion of the sensor-based map. For instance, the request can include an indication of the vehicle's last known or estimated location, and the computer system 150 may provide map data covering a certain distance around the indicated location. Sensor-based maps can be provided to the vehicle 102 in substantially real-time while the vehicle 102 is traveling within a geographic area covered by the sensor-based map. Sensor-based maps may also be communicated to the vehicle in advance and stored in memory 120 prior to travel within the covered geographic area.

The sensor-based maps received through communications system 118 can include filtered maps generated using sensor data captured by one or more vehicles 102. Filtered maps can be generated by removing extraneous information from unfiltered maps. In some implementations, the processing for generating a filtered map is performed by the computer system 150 based on sensor data and/or unfiltered maps received from the one or more vehicles 102. Accordingly, the communications system 118 may also be used to provide sensor data and/or unfiltered maps to the computer system 150. For example, the vehicles 102A, 102B, and 102N may be part of a vehicle fleet that travels throughout a geographic area to capture 2D and/or 3D representations using respective sensors 110 and then uploads the representations to the computer system 150 for forming and filtering a sensor-based map. Each vehicle 102 in a vehicle fleet contributing sensor data to a sensor-based map may be assigned to travel along a different portion of the geographic area. In some instances, the portions traveled by two vehicles may overlap. Redundancies in the sensor data provided by the one or more vehicles 102 can be eliminated when the sensor data is combined by the computer system 150.

Sensor-based maps can be updated based on newer sensor data. For instance, when navigating using a filtered map provided by the computer system 150, a vehicle 102 may, in addition to comparing data from the filtered map to sensor data capturing using one or more sensors 110 of the vehicle 102, also transmit the sensor data to the computer system 150 to enable the computer system 150 to determine whether to update the filtered map based on a change reflected in the sensor data. Examples of changes that may result in updating of a filtered map include the presence of detours, blocked roads, new buildings, and lane closures. Accordingly, a filtered map may be a product of sensor data collected through multiple runs across a geographic area by one or more vehicles.

I/O devices 122 may include one or more input devices configured to receive input from a driver or other occupant of the vehicle 102, for example, a keyboard or keypad, a touchscreen, a button, a knob, a microphone, and/or the like. Input devices can be located in a vehicle cabin, for example, on a center console, a steering wheel, or an overhead console. I/O devices 122 may also include one or more output devices configured to present audio, visual, and/or other types of output (e.g., haptic output) to a driver or other occupant. Examples of output devices include display monitors, loudspeakers, a light emitting diode (LED), and/or the like.

Computer system 150 is configured to generate and/or transmit filtered maps to vehicles 102. Accordingly, the computer system 150 can include a map generation system 152 and a communications system 154. The computer system 150 can be implemented using one or more computing devices, which may include, for example, a general-purpose computer, a storage server, or a network of computers. The computer system 150 may include one or more I/O devices 156 similar to the I/O devices 122 of vehicle 102, for example, a keyboard, a display monitor, a loudspeaker, and/or the like. As mentioned above, filtered maps can be generated in an automated manner with little or no manual supervision. In particular, the process of identifying and removing extraneous information from an unfiltered or input map can be performed without manual review of the unfiltered map. However, manual input can be provided, e.g., using an I/O device 156, in order to further refine a filtered map (e.g., by manually designating one or more features for removal) or to override a decision by the computer system 150 to remove a feature.

Map generation system 152 may be configured to generate an unfiltered map using sensor data from one or more vehicles 102. The sensor data can be provided through communications system 154 and may be sent through one or more communication networks 130, e.g., while a vehicle 102 is traveling within a geographic area or after a vehicle 102 has completed a run through the geographic area. The map generation system 152 can be implemented in hardware and/or software and may perform sensor fusion to identify features for removal. The sensor fusion performed by the map generation system 152 may involve combining disparate types of sensor data (e.g., camera images and LIDAR point clouds) to detect and classify features to be removed. In some implementations, unfiltered maps are generated using 3D data from a LIDAR or radar sensor and then filtered based on camera images or data from another type of sensor. The sensor fusion performed as part of filtering an unfiltered map may involve not only removing features associated with extraneous information, but also augmenting the sensor data of the unfiltered map to include more detail on features being retained. For example, camera images may provide color information that is absent from a LIDAR point cloud. Alternatively, sensor fusion may be performed prior to filtering in order to generate an unfiltered map as a product of sensor data from multiple types of sensors.

In some implementations, the map generation system 152 is configured to apply machine learning to identify features for removal. For example, the map generation system 152 may execute a machine learning algorithm or use a trained neural network to classify objects represented in sensor data according to a set of predefined categories (person, tree, road, lane, vehicle, etc.) and to identify the boundaries of each object. The machine learning algorithm or neural network may be pretrained using supervised learning on sensor data (e.g., camera images and/or LIDAR point clouds) for which the locations and boundaries of objects are known. Alternatively, unsupervised learning techniques may be used. The input to the machine learning algorithm or neural network can, for example, be a 3D representation and a corresponding 2D representation depicting the same location. The output of the machine learning or neural network can be a labeled or segmented 3D representation that depicts different classes of objects and the boundaries of such objects.

Whether performed algorithmically or through machine learning, the filtering process may involve a sequence of operations to first segment the 3D representation into different regions and assign a class label to each region. After segmenting the 3D representation, the boundaries of each object may be determined, for example, based on clustering of points in a point cloud. The segmentation and object boundaries can be determined taking into consideration information from the 2D representation, which can also be segmented and classified. In this regard, the 3D representation may contain depth information not available from the 2D representation, whereas color information in the 2D representation may enable objects that are near each other (e.g., a vehicle parked behind another vehicle) to be distinguished more readily. Thus, the 2D and 3D representations (or, in general, data from disparate sensor types) may collectively provide a more comprehensive view of the environment. Object boundaries can be class specific. For instance, 3D bounding box templates with different shapes may be available for fitting to segmented regions of the 2D representation and/or the 3D representation. In this manner, the map generation system 152 may determine a bounding box for an object in the 3D representation and/or a corresponding bounding box for the same object in the 2D representation.

After determining the boundaries for detected objects, the map generation system 152 may identify one or more features for removal from the 3D representation to generate an output 3D representation for inclusion as part of a filtered map. To identify an object for removal, the map generation system 152 can determine whether one or more criteria are satisfied. The criteria can be explicitly defined, for example, using if-then-else statements, case statements or other programming logic, or hardware logic (e.g., combinational logic circuits). Alternatively, the criteria can be defined through training of a machine learning model to configure parameters of the machine learning model (e.g., weights of a neural network). One criterion may be that the feature belongs to one or more predefined categories or object classes. For instance, features that are determined to be vehicles, pedestrians, trees, or other types of objects that are not suitable for use as reference features (e.g., because the objects are temporary or subject to change in appearance) may be selected as candidates for removal. Features that may serve as reference features, and which may therefore be retained, can include signs or boards along a road (e.g., a sign indicating the location of a nearby exit), a raised curb delineating the edge of a road, a building or other point of interest, barriers or retaining walls, and/or the like. The following is a non-exhaustive list of object classes that can be filtered out: lanes, moving objects, pedestrians, other vehicles (e.g., cars, bikes, trucks), plants, and animals.

Another criterion that the map generation system 152 may apply is a distance threshold. Features that are within a certain distance of the vehicle 102 that captured the sensor data for the 3D representation may be retained. For example, a tree twenty meters away may be removed. By contrast, another vehicle that is five meters away could be retained. Accordingly, not all features that are deemed unnecessary for determining the location of a vehicle may be removed. Limiting the filtering to features that exceed a threshold distance can reduce the amount of time taken in generating a filtered map, since each filtered map may potentially include numerous 3D representations, each 3D representation corresponding to a "snapshot" of the environment around the vehicle 102 at a different location within a geographic area covered by the filtered map.

Other criteria can be applied to filter out features that are unnecessary for determining location. For example, the map generation system 152 may apply one or more criteria relating to the attributes of detected objects, such as absolute speed, speed relative to the vehicle performing the sensing, physical state (e.g., moving or stationary), age, length, width, height, and shape. Thus, objects to be filtered out may include objects that are moving above a threshold speed, less than a threshold age (detectable based on comparing multiples sets of sensor data collected for the same location over time), smaller than a threshold length/width/height, or that meet certain shape requirements (e.g., objects with more than a threshold number of edges or objects with edges that exceed a threshold curvature). Another example is degree of confidence in object classification. In some implementations, the map generation system 152 is configured to determine a confidence value representing the likelihood that a class label assigned to a feature is the correct label for the feature. Objects that have confidence value below a confidence threshold may be retained in order to avoid removal due to false positive identification. Accordingly, the map generation system 152 may apply any number of criteria or combinations of criteria to filter out a feature when the feature satisfies such criteria. For instance, the map generation system 152 can be configured with multiple sets of criteria (e.g., different combinations of the above-mentioned criteria) so that a feature is filtered out when the feature satisfies any set within the multiple sets of criteria.

Computer system 150 may further include a memory 158. Like the memory 120, the memory 158 can include storage and/or working memory. The memory 158 may store a software application configured to provide map-related functionality. For instance, map generation system 152 may include one or more processors configured to execute program instructions in the memory 158 to generate and filter maps. Additionally, the memory 158 can store input and/or output data for the map generation system 152. Such data may include filter criteria 160, filtered maps 162, or unfiltered maps (not depicted). The filtered maps 162 can be stored for subsequent transmission to a vehicle 102, e.g., upon request from a particular vehicle or broadcast to multiple vehicles concurrently.

Figure 2:
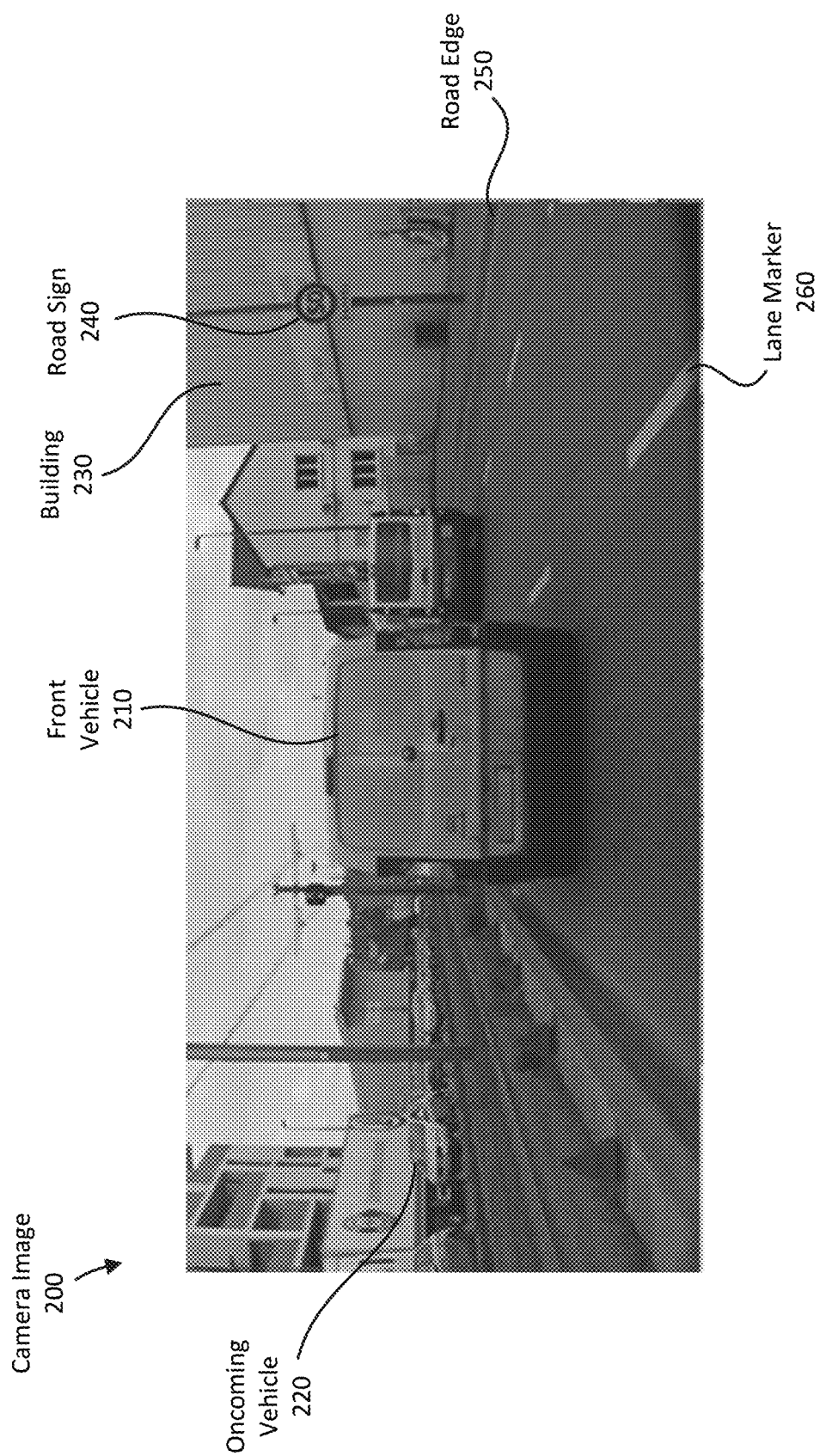
FIG. 2 shows an example of a 2D representation usable as input for filtering in accordance with one or more embodiments

FIG. 2 shows an example of a 2D representation usable as input for filtering in accordance with one or more embodiments. FIG. 2 is provided to illustrate examples of features (described in connection with FIGS. 3A and 3B) that can be filtered out without negatively impacting the ability to determine location. The 2D representation in FIG. 2 is a camera image 200 that may be captured, for example, using a front-facing camera of a vehicle 102. The image 200 may be a color image or a monochrome (e.g., black-and-white or grayscale) image. As shown in FIG. 2, the image 200 depicts a scene along a multi-lane road, with two directions of traffic and vehicles in both directions. The vehicles in the image 200 include vehicles in front of the vehicle that captured the image 200 (e.g., a front vehicle 210) and vehicles traveling in the opposite direction (e.g., an oncoming vehicle 220). The image 200 further shows an edge 250 of the road (delineated in this example by a raised curb), a lane marker 260, and structures along the sides of the road (e.g., a building 230 and a road sign 240).

Figure 3A:
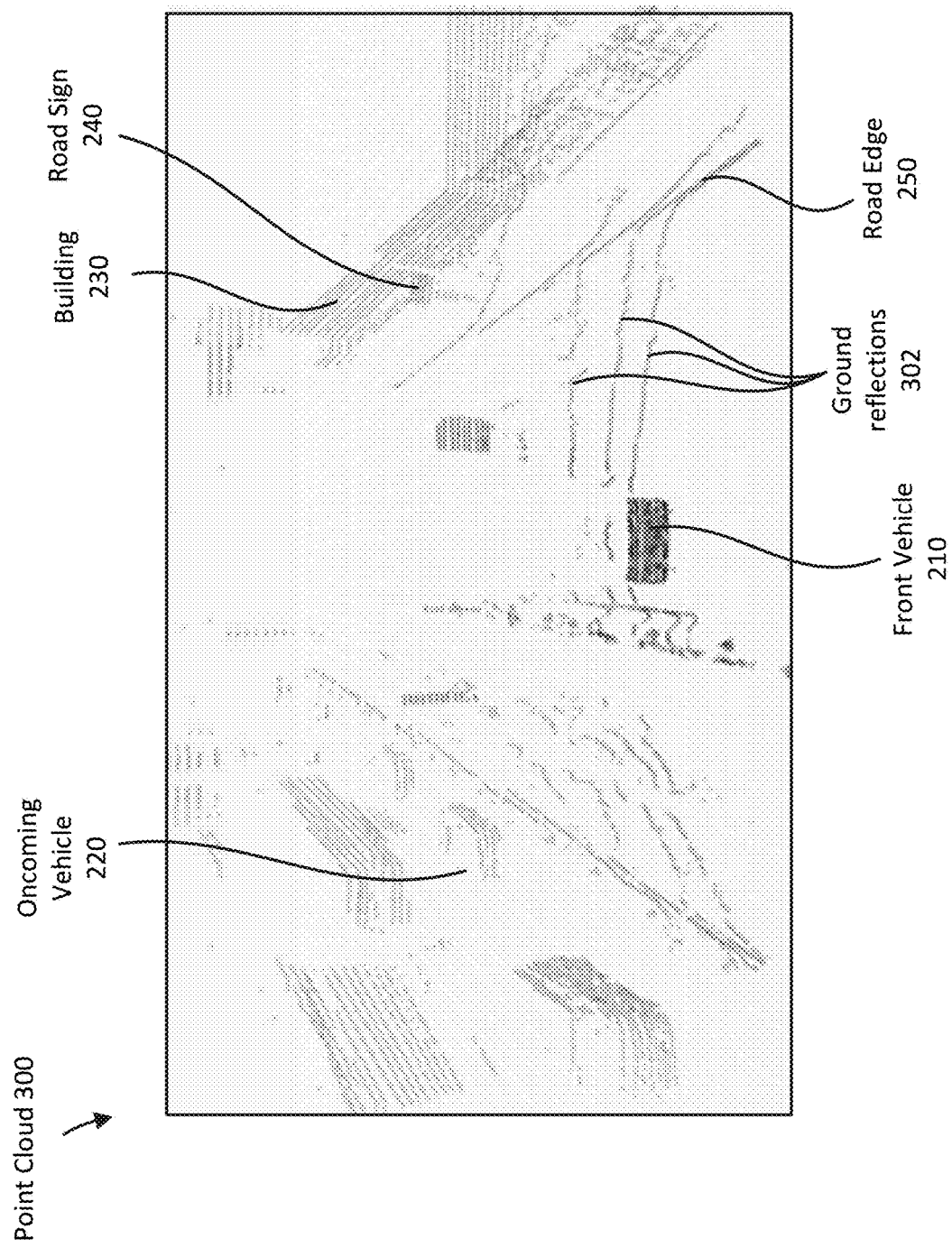
FIG. 3A shows an example of a 3D representation that can be filtered in accordance with one or more embodiments.

FIG. 3A shows an example of a 3D representation that can be filtered in accordance with one or more embodiments. The 3D representation in FIG. 3A is a point cloud 300 that may be captured, for example, using a LIDAR sensor of a vehicle 102 (e.g., the same vehicle that captured the image 200). Comparing the image 200 to the point cloud 300, it can be seen that these two representations show the same scene but from non-identical perspectives. For example, as shown in FIG. 3A, the point cloud 300 includes a first set of points associated with the front vehicle 210, a second set of points associated with the oncoming vehicle 220, a third set of points associated with the building 230, a fourth set of points associated with the road sign 240, and a fifth set of points associated with the road edge 250. The points in the point cloud 300 may be formed based on measurement of laser light or a radar signal reflected off objects in the environment. Differences in perspective may be a result of the sensors that captured the image 200 and the point cloud 300 having different fields of view, being pointed in different directions, being mounted in different locations, and/or other differences in sensor configuration. Point cloud 300 also includes ground reflections 302 corresponding to points generated as a result of reflection off the ground.

Figure 3B:
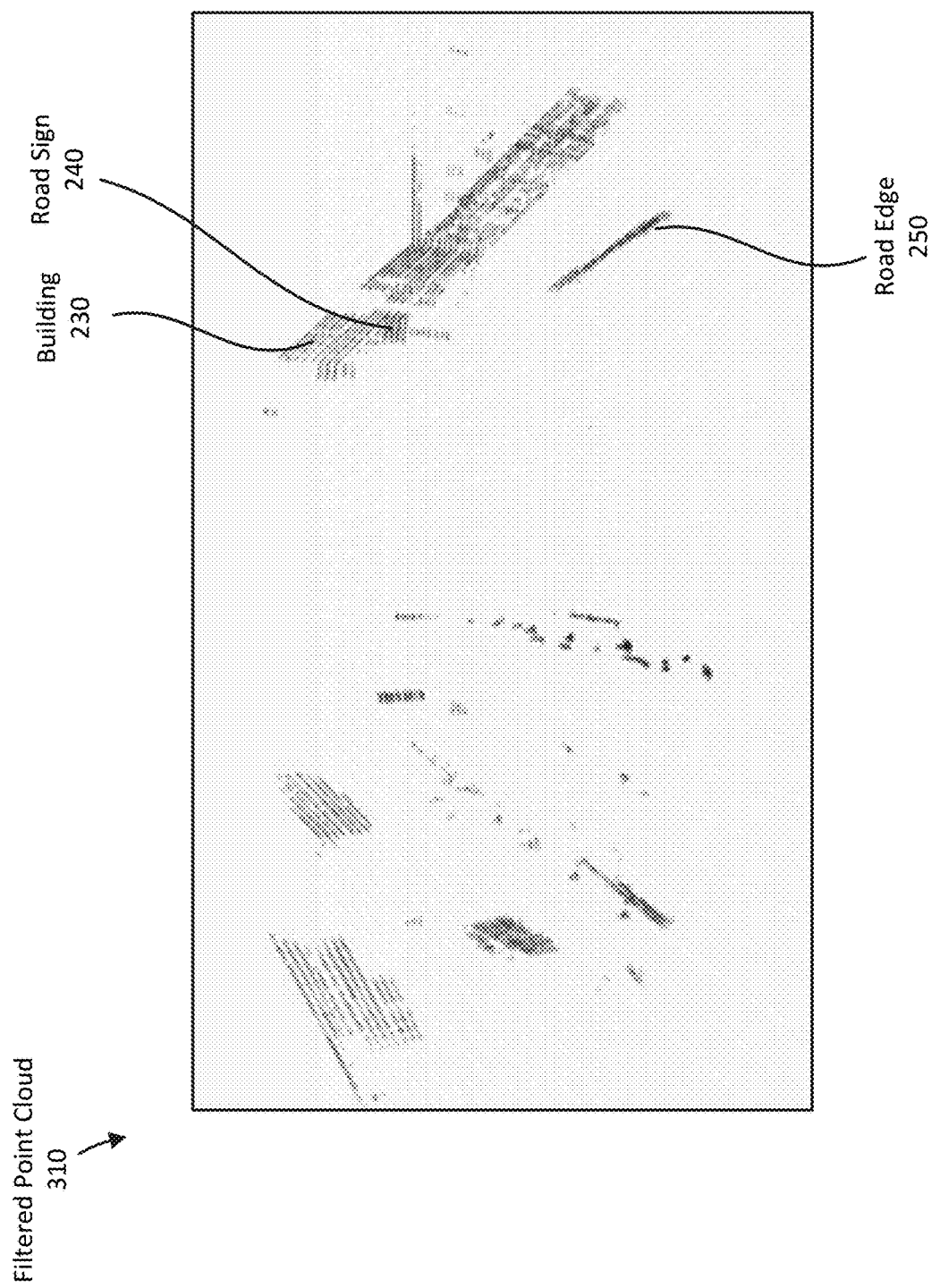
FIG. 3B shows a result of filtering the 3D representation of FIG. 3A to produce filtered data.

FIG. 3B shows a result of filtering the 3D representation of FIG. 3A to form a filtered point cloud 310. Comparing FIGS. 3A and 3B, it can be seen that the filtered point cloud 310 contains a significantly fewer amount of points. For instance, the points associated with the front vehicle 210 and the oncoming vehicle 220 are not present in the filtered point cloud 310. However, the points associated with the building 230, the road sign 240, and the road edge 250 remain. As discussed above, the filtering process may involve applying one or more criteria to identify, within sensor data captured using a first sensor, features that satisfy the one or more criteria and can be performed with the aid of sensor data from a second sensor. For instance, the filtered point cloud 310 may be generated as a result of filtering the point cloud 300 based on information contained in the image 200. The filtering of the point cloud 300 can be performed after segmenting the point cloud 300 into different regions corresponding to groups or clusters of related points (e.g., the first through fifth sets of points described above) and assigning class labels to each group of points. The filtered point cloud 310 can be combined with other filtered point clouds to form a filtered map, for example, by constructing a 3D representation of an extended section of the same road depicted in FIG. 3B using points from the filtered point cloud 310 and points from one or more additional filtered point clouds that depict a different portion of the road.

Figure 4:
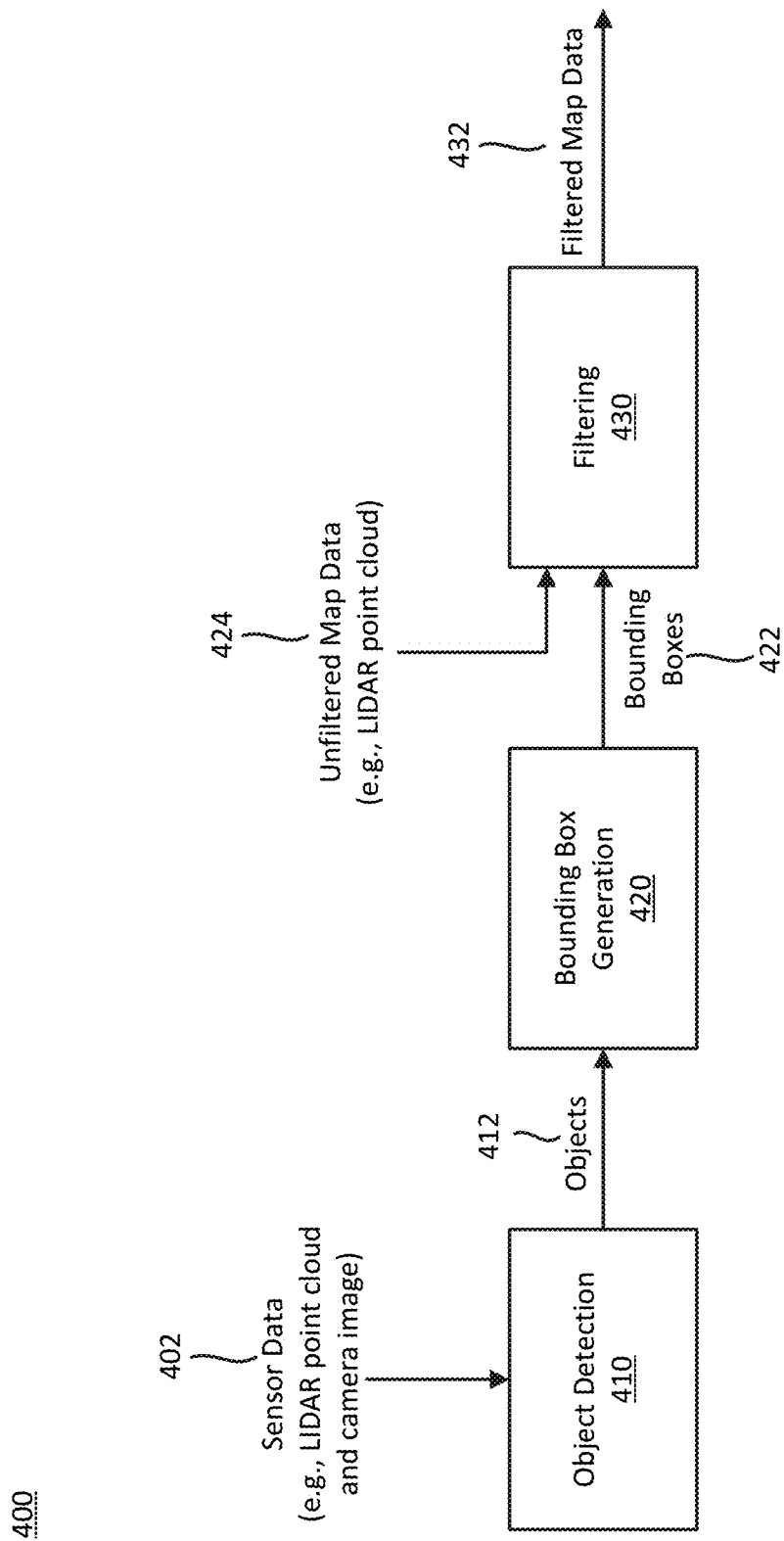
FIG. 4 shows an example of a sequence of operations that can be performed to generate a filtered map, according to an embodiment.

FIG. 4 shows an example of a sequence of operations 400 that can be performed to generate a filtered map, according to an embodiment. The operations depicted in FIG. 4 can be performed using one or more processors of a computer system, for example a processor implementing the map generation system 152 in FIG. 1. The sequence of operations 400 begins with an object detection stage 410. The object detection stage 410 may involve sensor fusion performed using sensor data 402 from multiple sensors. Sensor data 402 from different sensor types, for example, data from a LIDAR point cloud and data from a camera image, can be processed together to identify features in the sensor data as being objects that belong to one or more predefined object classes. For instance, a cluster of points located with a threshold distance of each other in a point cloud may be identified as belonging to the same object. Similarly, pixels that are of the same or similar color/luminance in a camera image may be identified as belonging to the same object. Objects 412 detected as a result of the processing in the object detection stage 410 are input to a bounding box generation stage 420.

In the bounding box generation stage 420, a bounding box can be formed around each object 412 to produce a set of bounding boxes 422. The bounding boxes 422 can be formed in two dimensions (2D boxes) and/or three dimensions (3D boxes) depending on the type of sensor data 402 provided as input to the object detection stage 410. In some implementations, bounding box generation is only applied to 2D sensor data and then mapped to corresponding regions of 3D sensor data, e.g., mapping boundaries determined using the 2D sensor data to corresponding points in a point cloud, as part of subsequent processing in a filtering stage 430. Bounding boxes can be rectangular or some other geometric shape depending on the level of precision desired. For complex shapes, a predefined shape template (e.g., a sedan shape, a van shape, a truck shape, etc.) may be applied using one or more geometric transformations, such as scaling or rotation, to form a bounding box that best fits a detected object.

The bounding boxes 422 are input to the filtering stage 430 together with unfiltered map data 424. The unfiltered map data 424 corresponds to a map that is to be filtered and may include a 3D representation of the same environment represented in the sensor data 402. In some implementations, the unfiltered map data 424 includes a subset of the sensor data 402, for example, the same LIDAR point cloud. However, there may or may not be overlap between the data input to the object detection stage 410 and the data input to the filtering stage 430. For example, the object detection stage 410 could be performed without using a point cloud that is to be filtered. The filtering stage 430 involves determining which of the objects 412, as defined by their corresponding bounding boxes 422, are to be removed from the unfiltered map data 424. As discussed above, the filtering can involve identifying objects that satisfy one or more criteria, where the one or more criteria provide a basis for distinguishing objects that are unnecessary for location determination. Removal of such objects results in filtered map data 432 that can be incorporated into a filtered map. For example, the filtered map data 432 may correspond to the filtered point cloud 310 in FIG. 3B.

Figure 8:
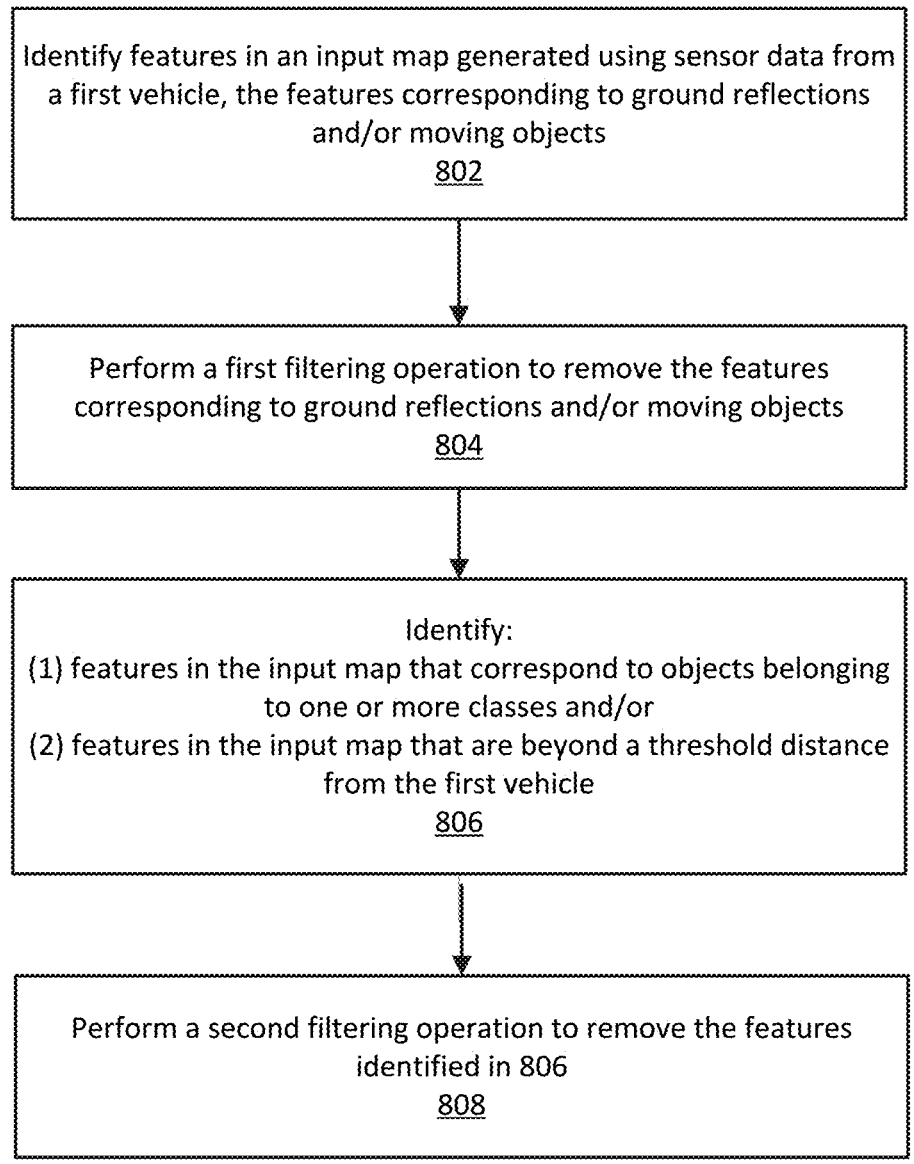
FIG. 8 is a flowchart of a process for filtering an input map, according to an embodiment.

The filtering stage 430 may involve multiple filtering steps. For example, an initial filtering step may remove ground reflections (e.g., the ground reflections 302 in FIG. 3A) and moving objects (e.g., front vehicle 210 and oncoming vehicle 220). Motion can be detected, for example, through point motion classification to identify groups of points that move by a different amount (e.g., distance) or in a different direction than the capturing vehicle. After removing ground reflections and moving objects, the remaining objects (associated with some or all of the bounding boxes 422) can be identified as being static, non-moving objects that belong to one or more object classes (vehicle, pedestrian, animal, etc.) and that can be removed through object-based filtering, using the one or more criteria. For instance, the initial filtering could filter out moving vehicles while the object-based filtering could filter out stationary or parked vehicles. As described above, one example of a filter criterion is a threshold distance. The threshold distance may define a region of interest within which features that otherwise satisfy the one or more criteria are nonetheless retained. For example, filtering may be limited to features located at least fifteen meters away in any direction. An example of a process for multi-step filtering is shown in FIG. 8, described below.

The filtered map data 432 includes a 3D representation (e.g., a 3D grid of points) that corresponds to an instantaneous snapshot of the environment around the vehicle. To generate a complete filtered map, multiple sets of filtered map data 432 can be combined, for example, such that each set of filtered map data 432 forms a separate 3D slice within an overall 3D volume representing a geographic area.

Figure 5B:
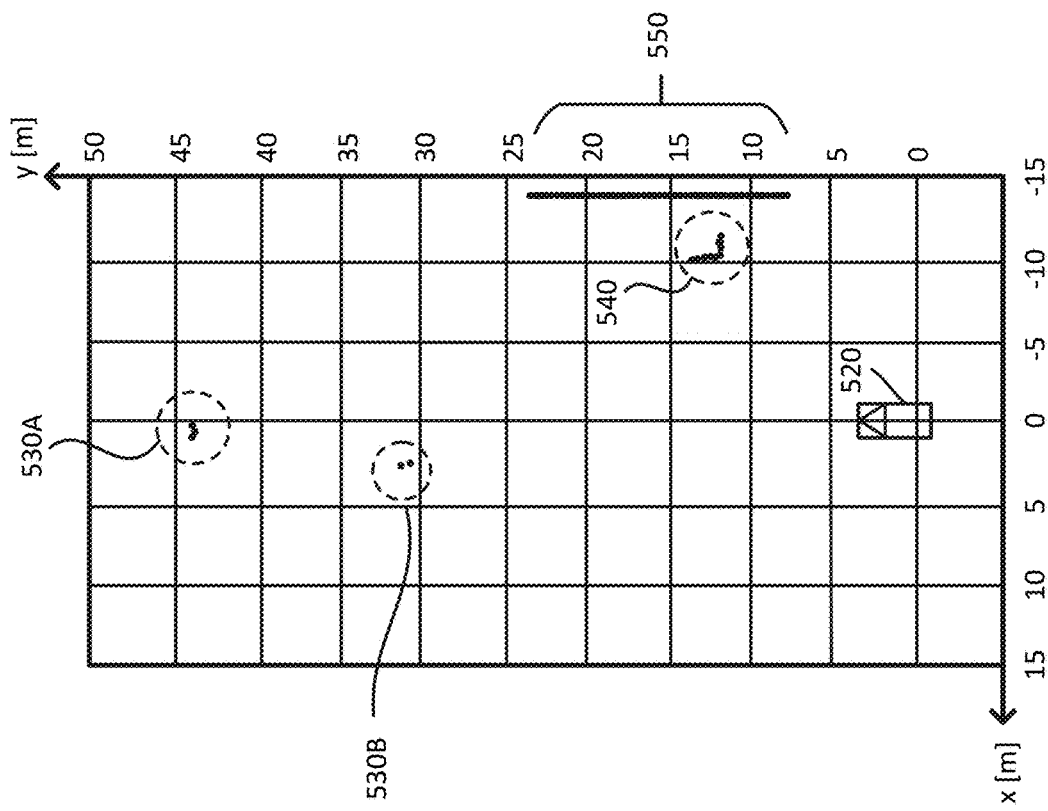
FIG. 5B shows an example of filtering the 3D representation in FIG. 5A.
Figure 5A:
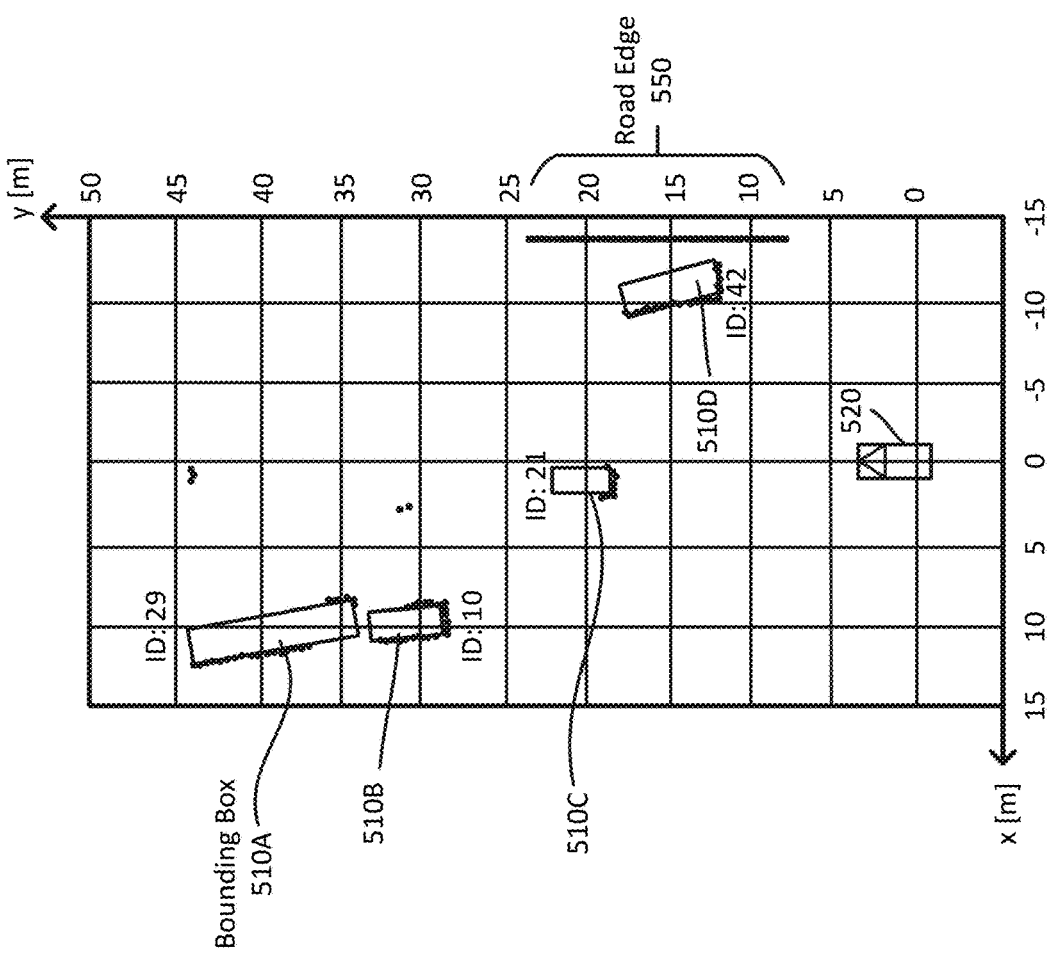
FIG. 5A shows an example of bounding boxes applied to a 3D representation of an environment.

FIG. 5A shows an example of bounding boxes applied to a 3D representation of an environment. Although the underlying data is three-dimensional, FIG. 5A corresponds to an overhead view of the environment and is therefore shown using a 2D coordinate system, where the horizontal (x) axis represents lateral distance in meters and the vertical (y) axis represents longitudinal distance in meters. The distances in FIG. 5A are relative to a vehicle 520 that captured the 3D representation. Thus, the vehicle 520 is located at the origin (0, 0) of the 2D coordinate system. In the example of FIG. 5A, the 3D representation is a point cloud with points scattered around bounding boxes 510A, 510B, 510C, and 510D. The bounding boxes 510A-D represent other vehicles around the vehicle 520. The point cloud further includes points associated with other physical features in the environment, such as a road edge 550. As shown in FIG. 5A, each object represented by a bounding box 510 can be assigned a unique identifier (ID).

FIG. 5B shows an example of filtering the 3D representation in FIG. 5A. FIG. 5B includes points that remain after filtering has been performed. As shown in FIG. 5B, there are no points associated with the bounding boxes 510A, 510B, and 510C. This is a result of identifying the objects corresponding to the bounding boxes 510A, 510B, and 510C for removal. However, there are points associated with the road edge 550 in addition to extraneous points 530A, 530B, and 540. The extraneous points 530A and 530B may correspond to noise or artifacts and were not labeled as belonging to a class of object to be removed, but can optionally be removed subject to further filtering and do not have a significant effect on determining the location of a vehicle. The extraneous points 540 also do not have a significant effect on location determination and represent points associated with the vehicle corresponding to the bounding box 510D and which, despite belonging to a class of object to be removed (e.g., other vehicle), remain as a result of applying a threshold distance of fifteen meters as a criterion for removal. As discussed above, features that are within a threshold distance can be retained in order to reducing processing time. In this example, the points 540 are within fifteen meters of the vehicle 520, whereas points around the bounding boxes 510A, 510B, and 510C are all located beyond fifteen meters.

Figure 6:
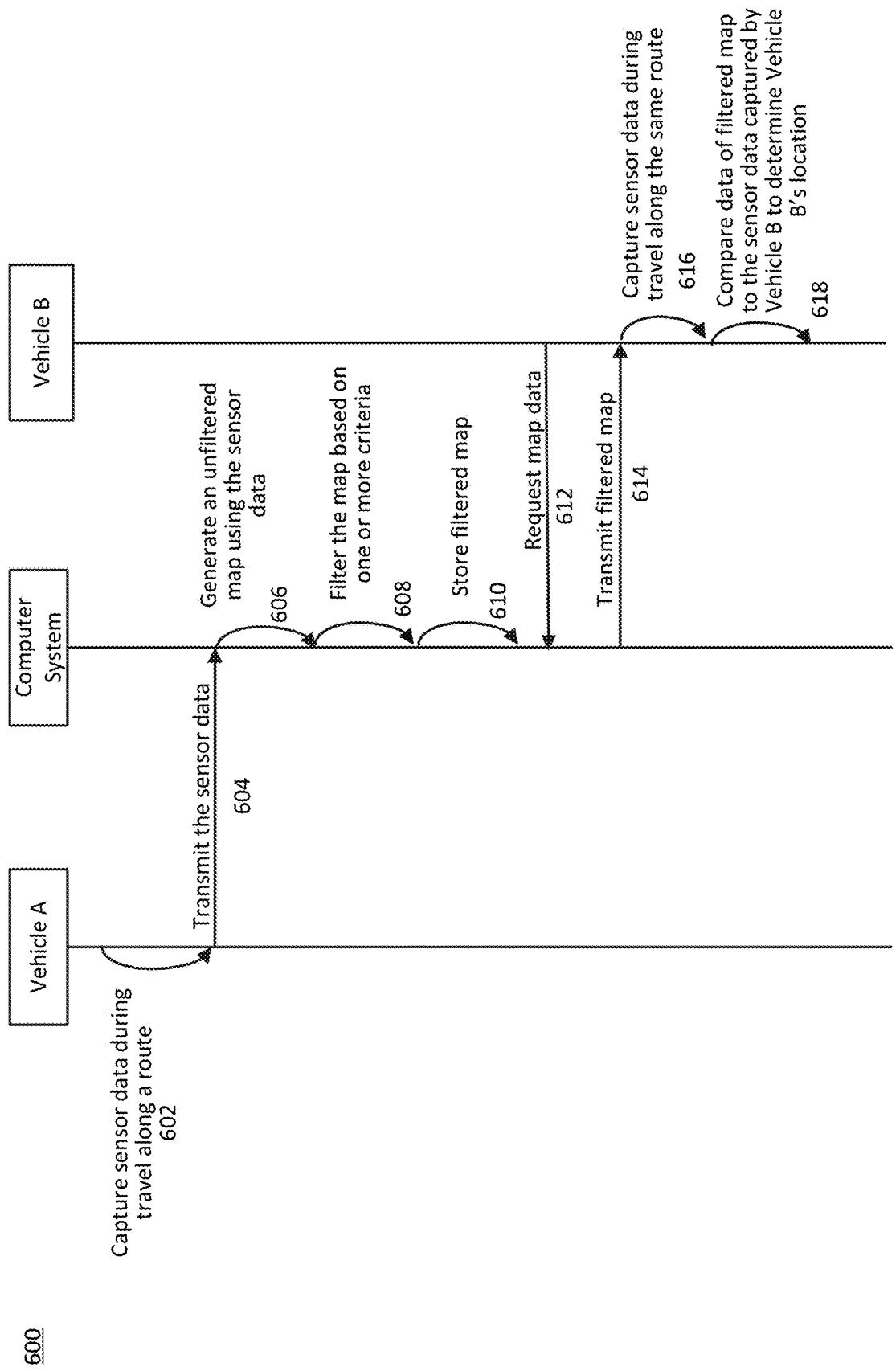
FIG. 6 is a flow diagram of a process for generating and using a filtered map, according to an embodiment.

FIG. 6 is a flow diagram of a process 600 for generating and using a filtered map, according to an embodiment. The process 600 can be performed by a first vehicle (A), a second vehicle (B), and a computer system (e.g., the computer system 150). At 602, vehicle A captures sensor data during travel along a route. The sensor data is captured using a first sensor onboard vehicle A and may include, for example, a 3D representation such as a point cloud captured using a LIDAR or radar sensor. The sensor data may further include data captured using a second sensor onboard vehicle A, e.g., a camera, a radar sensor, or another LIDAR sensor. The second sensor operates as a reference sensor capturing data that can be used to filter the 3D representation. The data captured by the second sensor may be captured contemporaneously with the data captured by the first sensor and may depict the same scene (e.g., the same portion of a road along the route). The route extends through a geographic area being mapped and includes one or more drivable portions of the geographic area, for example, one or more streets, highways, bridges, etc. The route can be pre-planned or, in some instances, a route chosen by the driver of vehicle A at the time of travel. As shown in FIGS. 2 and 3A, the sensor data may include instantaneous representations of the environment around the capturing vehicle at any given time. The sensor data captured in 602 can include multiple sets of 2D and/or 3D representations captured at different times and depicting different portions of the route.

At 604, vehicle A transmits the sensor data captured to the computer system. The sensor data can be transmitted in substantially real-time using wireless communication, for example, while traveling along the route or shortly after completing the route. Alternatively, the sensor data can be stored in a memory of vehicle A and uploaded to the computer system using a wired connection when the vehicle A is available to be communicatively coupled to the computer system by wire.

At 606, the computer system generates an unfiltered map using the sensor data. The unfiltered map may include a 3D representation of the entire route traveled by vehicle A and can be generated for, example, by combining a set of point clouds or other 3D representations taken along the route.

At 608, the computer system filters the map based on one or more criteria to remove extraneous information. The filtering removes features that satisfy the one or more criteria and can be performed, for example, in accordance with the process depicted in FIG. 4. Accordingly, the functionality in 608 may include segmenting a first representation captured using a first sensor (e.g., a camera image) to determine that one or more regions in the first representation correspond to a class of object that can potentially be removed, then determining a bounding box for each of the one or more regions. The functionality in 608 may further include applying the one or more criteria to determine which bounding boxes are associated with features that are to be removed from a second representation captured using a second sensor (e.g., a LIDAR point cloud) to produce filtered map data for inclusion in the filtered map. The filtering process can be repeated for corresponding sets of representations (e.g., a camera image and a point cloud depicting the same portion of the route) to produce filtered map data for the entire route traveled by vehicle A.

At 610, the computer system stores the filtered map in a memory accessible to the computer system, e.g., a local memory or an external server. The computer system makes the filtered map available to vehicle B. For example, the filtered map can be read from storage and broadcast to vehicle B and other vehicles in communication with the computer system or sent in response to a request (in 612) from vehicle B. In some instances, the filtered map may include additional sensor data contributed by other vehicles that travel the same route or additional routes nearby. For example, vehicle A may be part of a fleet of vehicles tasked with mapping different parts of the geographic area. The additional sensor data can be filtered in the same manner as the sensor data captured by vehicle A.

At 612, vehicle B requests map data from the computer system. The request in 612 may indicate a location for which map data is being requested, e.g., the geographic area including the route traveled by vehicle A. The location indicated in the request can be specified at various levels of specificity. For instance, the request may include the last known or estimated coordinates of vehicle B and/or identify the geographic area or a sub-region within the geographic area by name. The request in 612 can be transmitted via a wireless connection (e.g., a cellular, Wi-Fi, or WiMax connection) and through one or more communication networks. The request in 612 can be timed so that the filtered map or a relevant portion thereof is received by the vehicle B shortly in advance of vehicle B arriving at a location represented in the filtered map, for example, several seconds or minutes before the vehicle arrives at the location.

Figure 10A:
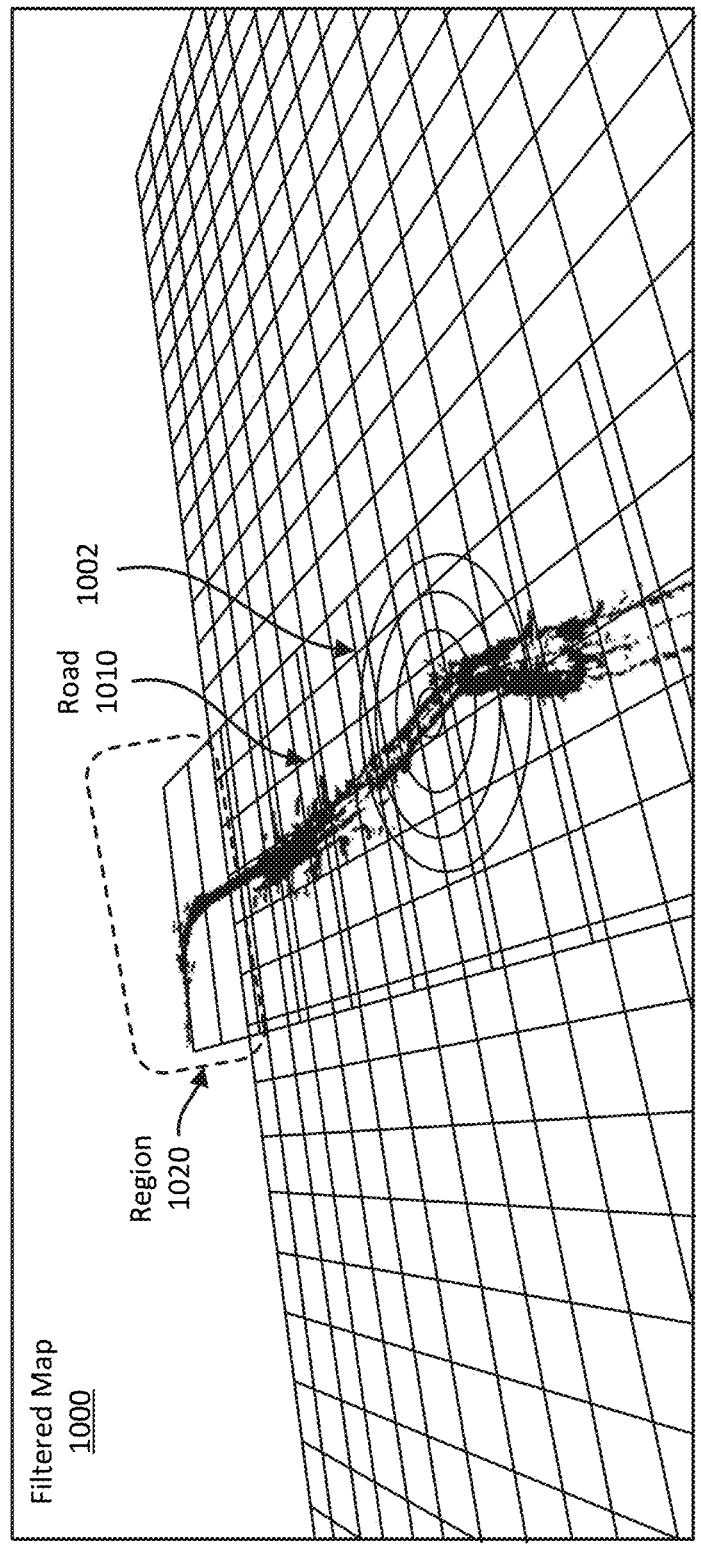
FIGS. 10A-10C show examples of a filtered map being received over a period of time, according to some embodiments.
Figure 10B:
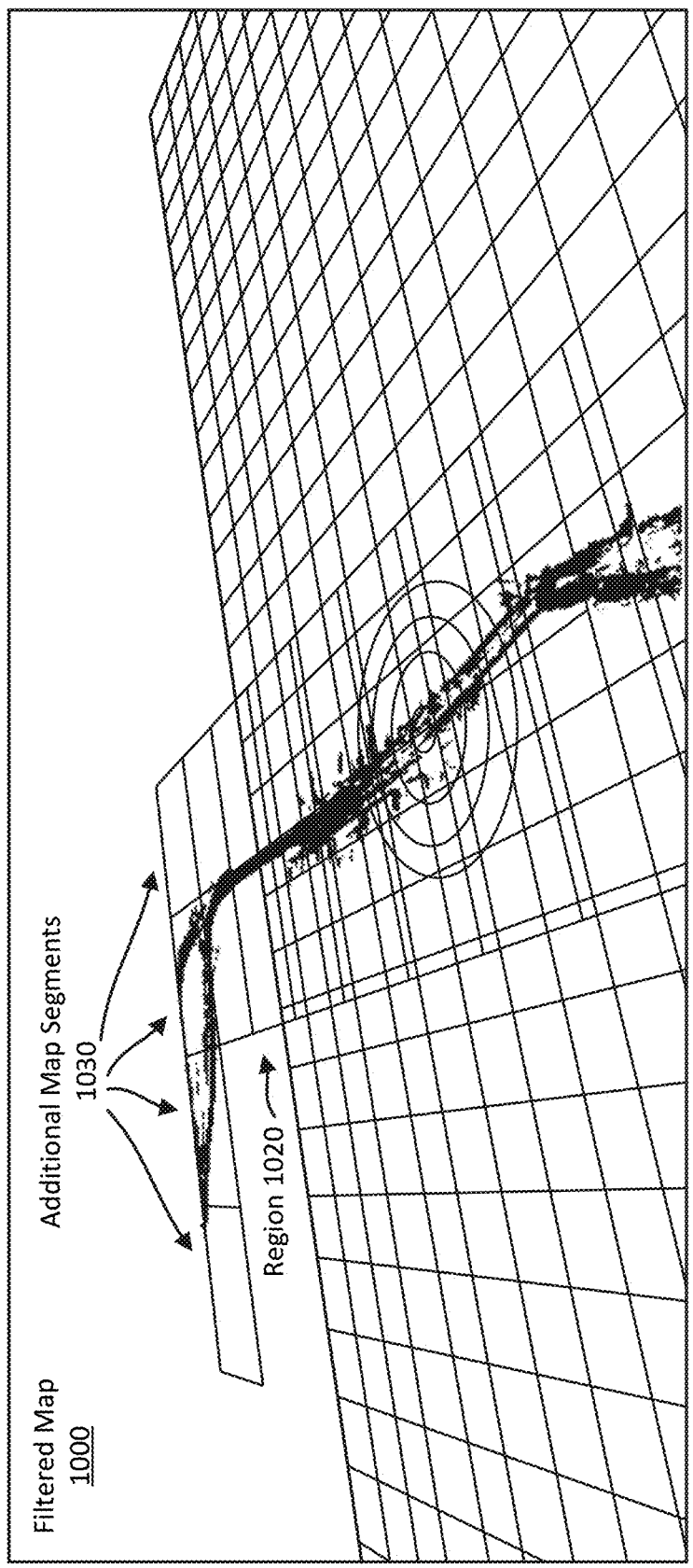
Figure 10C:
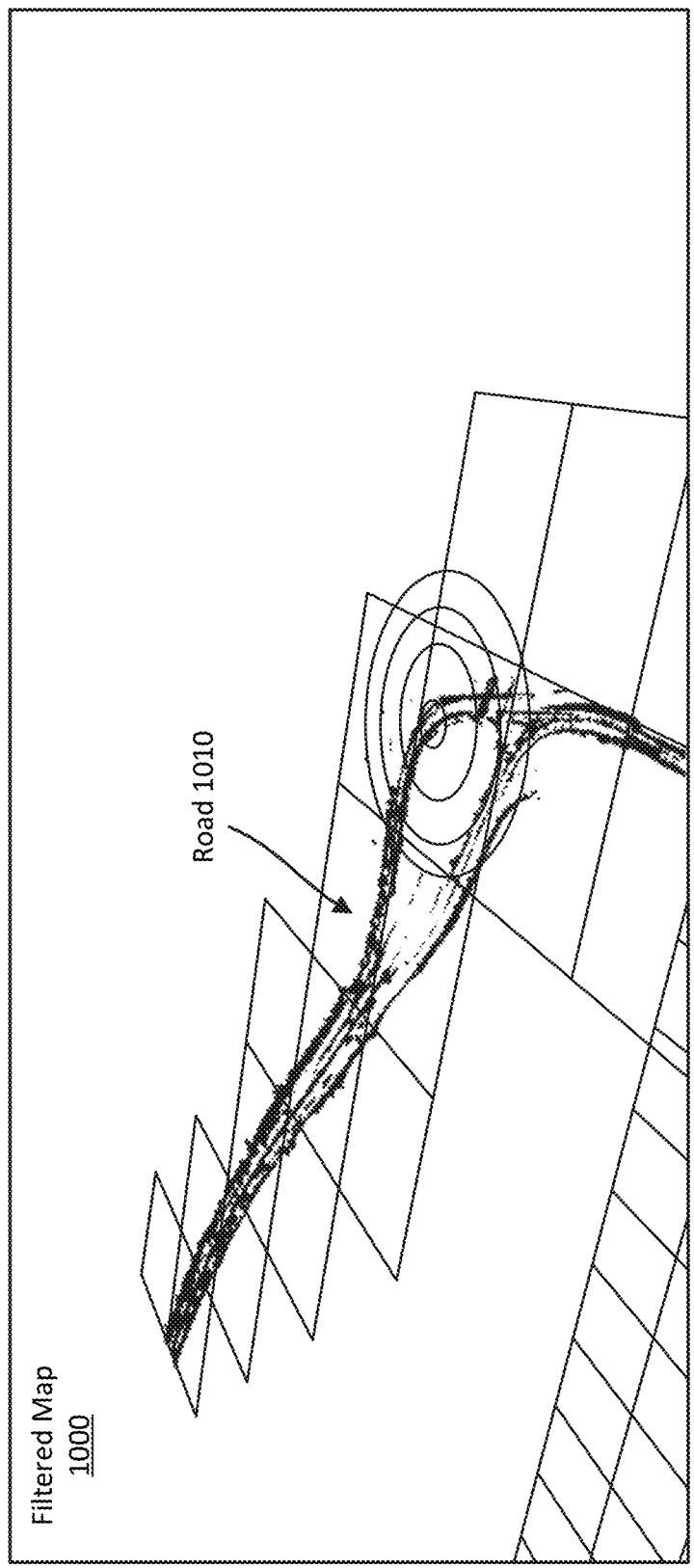

At 614, the computer system transmits, in response to the request in 612, the filtered map to vehicle B, for example, via the same wireless connection via which the request 612 was sent. Depending on the amount of data to be transmitted, the computer system may transmit all or a portion of the filtered map. FIGS. 10A-10C, described below, show an example of filtered map data being downloaded by a vehicle over time such that the vehicle receives incremental updates of map data relevant to the local area around the vehicle.

At 616, vehicle B captures sensor data during travel along the same route traveled by vehicle A. The vehicle B does not necessarily travel an identical route as that traveled by vehicle A in 602. However, the sensor data captured in 616 overlaps with the sensor data captured in 602 in that it contains one or more representations of the same location along the route. In particular, the sensor data captured in 616 may include a representation of vehicle B's current surroundings, with the current surroundings also being represented in the map data received by vehicle B in 614. Accordingly, by comparing the sensor data captured in 616 to data in the filtered map, it may be possible to determine where vehicle B is located.

At 618, vehicle B compares data of the filtered map to the sensor data captured in 616 to determine vehicle B's location. The comparison in 618 may involve identifying one or more matching features contained in the filtered map to determine, based on the presence of the matching feature(s) that the vehicle B is currently at a particular location along the route previously traveled by vehicle A. For example, referring to FIG. 3B, vehicle B may capture a point cloud that depicts the road sign 240 and the road edge 250, possibly from a slightly different perspective. The difference in perspective may be due to sensor configuration (e.g., a LIDAR sensor of vehicle B being mounted at a different height than a LIDAR sensor of vehicle A), vehicle position (e.g., vehicle B traveling in a different lane than a lane in which vehicle A was in), and/or other factors. By comparing the relative positions of the road sign 240, the road edge 250, and/or other features in the point cloud captured by vehicle B, the vehicle B may determine that such features are a match to features contained in the filtered point cloud 310, and therefore that the current location of vehicle B is the location depicted in the filtered point cloud 310.

Figure 7:
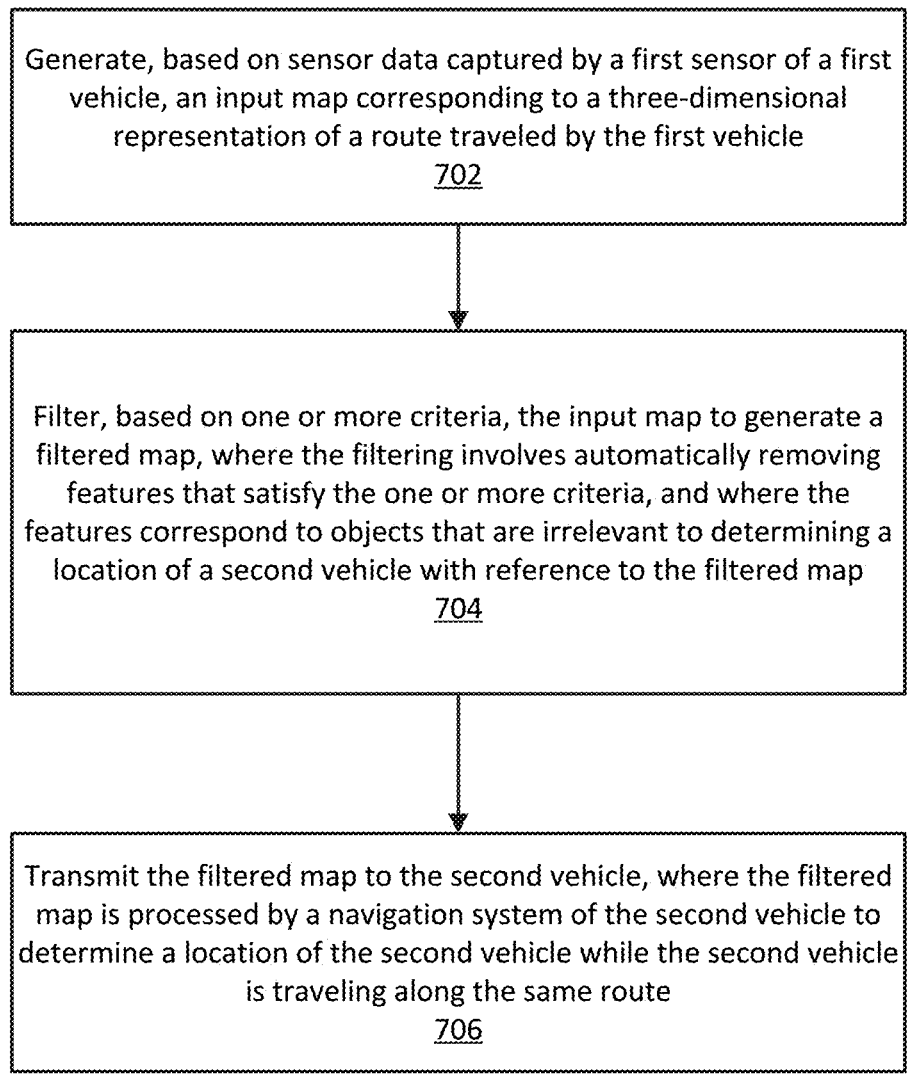
FIG. 7 is a flowchart of a process for generating a filtered map, according to an embodiment.

FIG. 7 is a flowchart of a process 700 for generating a filtered map, according to an embodiment. The process 700 can be performed by one or more processors of a computer system configured to receive sensor data from one or more vehicles, such as the computer system 150. At 702, the computer system generates, based on sensor data captured by a first sensor of a first vehicle (e.g., vehicle A in FIG. 6), an input map corresponding to a 3D representation of a route traveled by the first vehicle. The functionality in 702 can be implemented in accordance with the processing described in connection with 606 of FIG. 6 to produce an unfiltered or "raw" map as the input map.

At 704, the computer system filters the input map based on one or more criteria to generate a filtered map. The functionality in 704 can be implemented in accordance with the processing described in connection with 608 of FIG. 6 and using, for example, the filtering process shown in FIG. 4. Thus, the filtering in 704 may involve automatically removing features that satisfy the one or more criteria. As described above, the criteria can be selected to correspond to attributes associated with features that are unnecessary for location determination. Features which satisfy the one or more criteria may correspond to objects that are irrelevant to determining a location of a second vehicle (e.g., vehicle B in FIG. 6) with reference to the filtered map.

At 706, the computer system transmits the filtered map to the second vehicle. The computer system can store the filtered map prior to transmission, e.g., as part of the filtered maps 162 in FIG. 1. After the second vehicle receives the filtered map, the filtered map can be processed by a navigation system of the second vehicle to determine a location of the second vehicle while the second vehicle is traveling along the same route. As described above in connection with 618 of FIG. 6, processing by the second vehicle may involve comparing sensor data captured by a sensor of the second vehicle to data from the filtered map to identify one or more matching features.

The filtered map can be updated after being transmitted in 706. Updating of the filtered map can be based on sensor data captured during a subsequent run through the same route. The subsequent run can be performed by vehicle A or some other vehicle in communication with the computer system. For example, the updating of the filtered map could be performed based on sensor data captured by the second vehicle. The computer system can compare sensor data captured during the subsequent run to determine whether there are any significant changes to the filtered map, for instance, a road that is now blocked by barriers, a diversion of lanes as indicated by traffic cones, a detour, etc. In some implementations, updating of filtered maps may involve manual input to select or confirm an automated selection of a change. Filtering of sensor data used to update the filtered map can be performed in the same automated fashion as when the filtered map was initially generated.

FIG. 8 is a flowchart of a process 800 for filtering an input map, according to an embodiment. The process 800 can be performed by one or more processors of a computer system to implement the functionality in block 704 of FIG. 7. At 802, the computer system identifies features in an input map generated using sensor data from a first vehicle. The features identified in 802 correspond to ground reflections and/or moving objects. As described above in connection with FIG. 4, moving objects can be detected using point motion classification to identify groups of points that move in a different direction or by a different amount than the capturing vehicle (here, the first vehicle). Ground reflections can be identified by defining a ground plane based on the detected boundaries of a road or drivable surface within the filtered map. Points or features that are located in the ground plane and which have not been classified as being objects can be identified as being ground reflections. Other techniques for identifying ground reflections may be used.

At 804, the computer system performs a first filtering operation to remove the features identified in 802 as corresponding to ground reflections and/or moving objects. The first filtering operation produces a partially filtered map that contains less information (e.g., fewer points) than the input map but which can be further filtered. The first filtering operation is performed to eliminate features that can be identified as being unnecessary without resorting object classification. Since object classification can be computationally expensive compared to identifying ground reflections or moving objects, the first filtering operation can speed up processing time by reducing the amount of data to which object-based filtering is applied.

At 806, the computer system identifies features in the input map that correspond to objects belonging to one or more classes. For example, the features identified in 806 may include points associated with bounding boxes that are labeled as being vehicles. Alternatively or additionally, the computer system identifies features that are beyond a threshold distance from the first vehicle. Identifying features corresponding to objects that belong to one or more classes can be performed as part of object-based filtering, using one or more object classes as filter criteria. Identifying features that are beyond a threshold distance can be performed as part of distance-based filtering, using the threshold distance as a filter criterion. For example, a threshold distance of fifteen meters can be used to define a rectangular region of interest such that features more than fifteen meters away in a lateral or longitudinal direction are identified for removal.

At 808, the computer system performs a second filtering operation to remove the features identified in 806. The second filtering operation produces a filtered map that can then be transmitted to a second vehicle.

Figure 9:
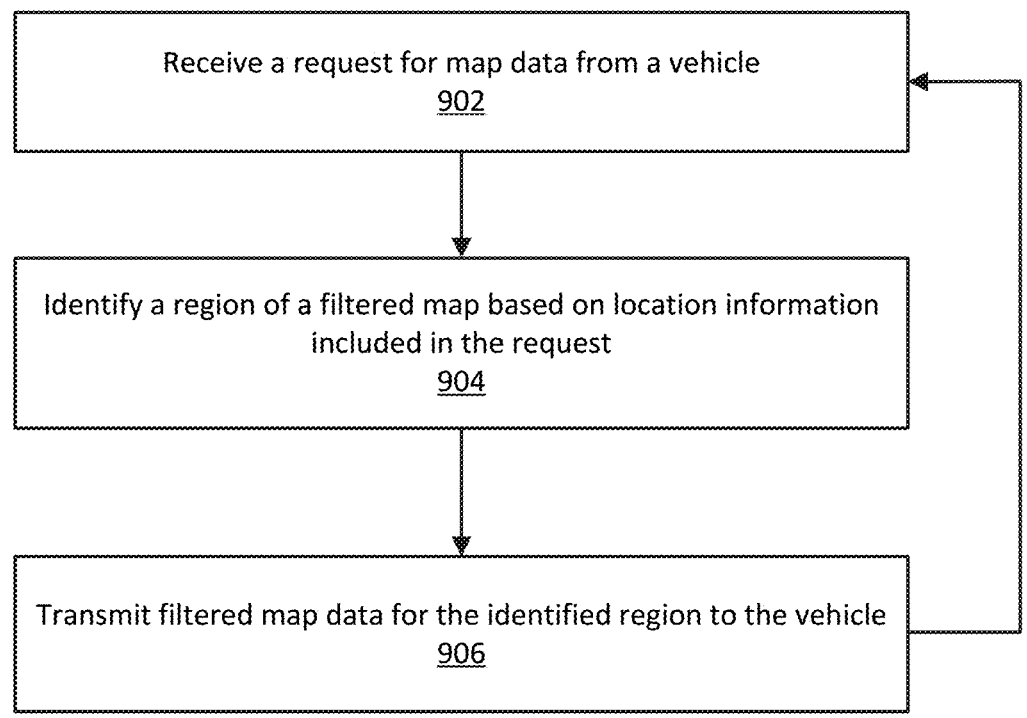
FIG. 9 is a flowchart of a process for transmitting a filtered map to a vehicle, according to an embodiment.

FIG. 9 is a flowchart of a process 900 for transmitting a filtered map to a vehicle, according to an embodiment. The process 900 can be performed by one or more processors of a computer system in communication with a vehicle, such as computer system 150. The process 900 can be performed by the same or a different computer system than the computer system that generates the filtered map. At 902, the computer system receives a request for map data from a vehicle. The request can be sent wirelessly through one or more communication networks, for example, a 4G or 5G cellular network. The request may be sent in connection with the vehicle switching from GNSS-based navigation to sensor-based navigation. For example, the request could be sent when the vehicle is unable to receive and/or decode signals from GPS satellites. The request for map data does not necessarily have to occur in connection with switching to sensor-based navigation. For example, the request in 902 could occur during GPS-based navigation or even during the course of driving without navigation assistance, so that the filtered map is available in case the vehicle needs to use the filtered map in the future.

At 904, the computer system identifies a region of a filtered map based on location information included in the request. The location information may correspond to the approximate location of the vehicle. For example, the request in 902 could include the vehicle's last known or estimated coordinates (e.g., the most recent location determined using a GNSS-based positioning method). Alternatively or additionally, the request could specify the region by name (e.g., street or city name). The region can encompass an area ahead of the vehicle, for example, an area that the vehicle is expected to reach based on a current trajectory of the vehicle. The region may further encompass an area that the vehicle has already passed. In some implementations, the filtered map is a 3D map (e.g., a 3D grid of points) that is divided into different regions along two dimensions (e.g., latitude and longitude) so that each region corresponds to a respective tile (a rectangular block) within the 3D grid. Accordingly, the region identified in 904 may include one or more tiles that cover a portion of a geographic area represented in the filtered map.

At 906, the computer system transmits filtered map data for the region identified in 904 to the vehicle. The filtered map data may include data for one or more tiles within the 3D grid mentioned above. For example, the filtered map can be in a Point Cloud Data (PCD) format so that the transmission in 906 involves transmitting one or more PCD files containing the data for the one or more tiles (e.g., a separate PCD file for each tile). The process 900 may return to block 902 with a subsequent request for map data so that another region of the filtered map is identified and transmitted to the vehicle. In this manner, the vehicle may periodically receive filtered map data (e.g., every few seconds or minutes). Filtering reduces the overall map size, which enables the filtered map to be transmitted to the vehicle with less latency. The reduction in map size can also reduce the amount of time taken in determining the location of the vehicle, for example, as a result of there being fewer points or features to match against.

FIGS. 10A-10C show examples of a filtered map 1000 being received over a period of time, according to some embodiments. The filtered map 1000 is a 3D grid that is divided into square or rectangular tiles. Each tile represents a different segment of the filtered map and may contain one or more points corresponding to features within a covered geographic area. For instance, the contour of a road 1010 is indicated by points located along edges of the road. The filtered map 1000 as depicted in FIGS. 10A-10C is intended to illustrate how map data can be made available to a vehicle based on changes in the location of the vehicle over time. The filtered map 1000 can be displayed to a driver of the vehicle, but display is optional.

In FIG. 10A, the filtered map 1000 is shown with concentric rings 1002. The rings 1002 are centered about the current location of the vehicle. The outermost ring represents a maximum detection range of a sensor (e.g., a LIDAR sensor) onboard the vehicle. As shown in FIG. 10A, the filtered map 1000 covers a geographic area that encompasses not only a portion of the road 1010 at the current location of the vehicle, but also an upcoming portion of the road that is located in a region 1020 where the vehicle is heading, beyond the maximum detection range of the sensor. Accordingly, at the time instant represented in FIG. 10A, the vehicle may have map data available that covers the geographic area up to and including the region 1020. However, map data for areas beyond the region 1020 (e.g., tiles corresponding to farther sections of the road 1010) may not be available. The unavailability of some portions of the filtered map 1000 may be a result of bandwidth constraints and/or the data size of the filtered map 1000. When bandwidth is limited or the size of the filtered map makes it impractical to transmit the filtered map all at once, the filtered map may instead be transmitted to the vehicle in pieces.

In FIG. 10B, new tiles (additional map segments 1030) have been added to the filtered map 1000 received by the vehicle. As shown in FIG. 10B, the vehicle is now closer to the region 1020 than in FIG. 10A. The additional map segments 1030 may have been selected for transmission based on the vehicle's current location, for example, so that the vehicle has map data for tiles up to a certain distance away from the vehicle's current location. FIG. 10B also shows that the new tiles can be limited to areas around the current path of travel, e.g., tiles that cover the road 1010.

FIG. 10C shows another view of the filtered map 1000 at a time in which the vehicle is located in the area represented by the additional map segments 1030. As shown in FIG. 10C, the filtered map 1000 includes points that show the road 1010 splitting into two branches, with the vehicle being located in the branch on the right side. The two branches are also shown in FIG. 10B.

Figure 11:
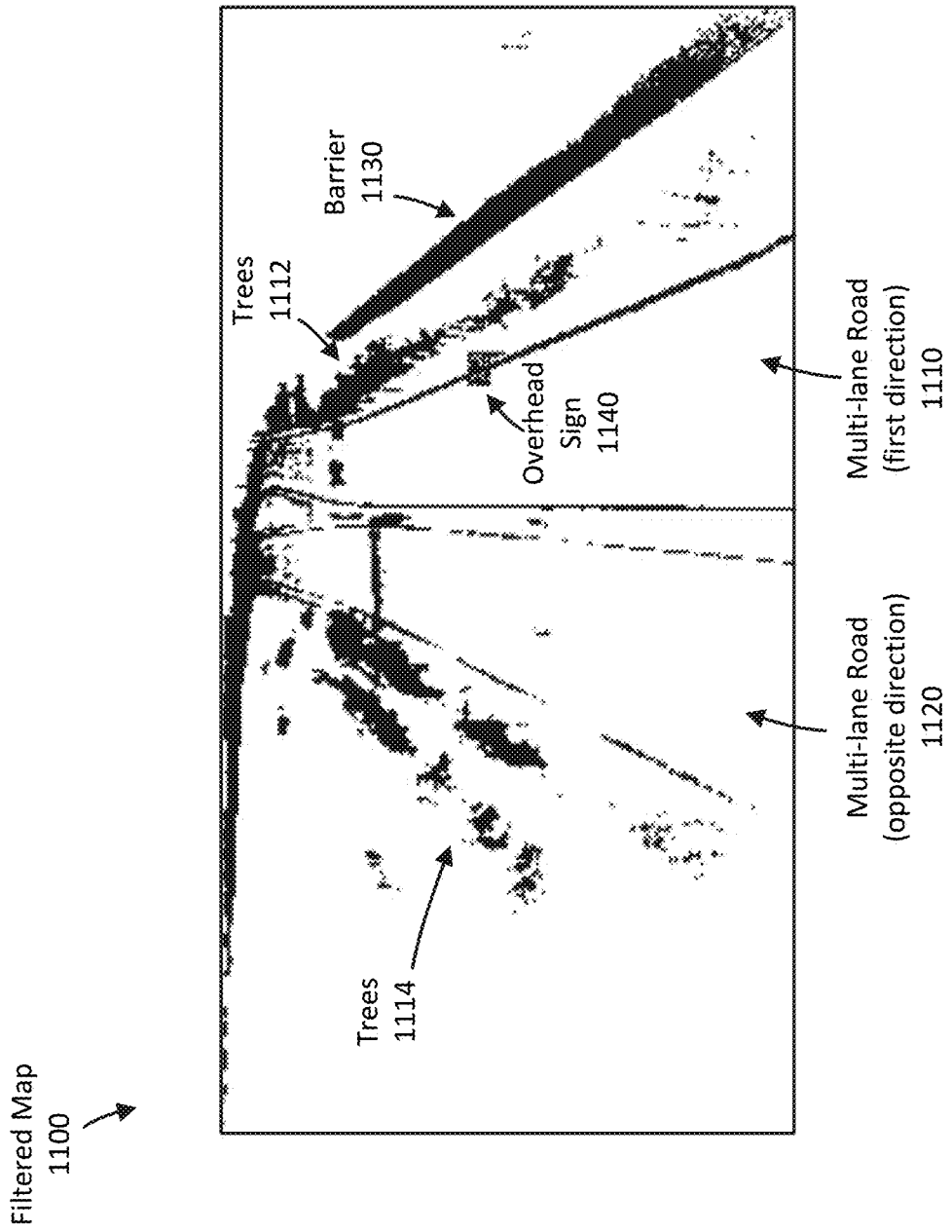
FIG. 11 shows an example of a filtered map according to some embodiments.

FIG. 11 shows an example of a filtered map 1100. The filtered map 1100 is shown from a closer perspective compared to the filtered map 1000 in FIGS. 10A-10C and may, for example, correspond to a zoomed-in view of one of the tiles in the filtered map 1000. FIG. 11 is provided to illustrate examples of features that could be used for matching to corresponding features captured by a sensor of a vehicle in order to determine the location of the vehicle. The filtered map 1100 shows a multi-lane road that includes traffic lanes in a first direction 1110 and traffic lanes in an opposite direction 1120. The individual lanes are not visible. Instead, the road appears as a collection of points that show the edges of the road along both directions 1110 and 1020. Trees 1112 adjacent to the side of the road along the first direction 1110 and trees 1114 adjacent to the side of the road along the opposite direction 1120 are visible. The trees 1112 and 1114 may correspond to points that are leftover after applying a threshold distance as discussed above. The trees 1112 and 1114 are unnecessary for location determination and may, in fact, be difficult to match against due to changes in appearance over time (e.g., seasonal foliage). However, the location of a vehicle can still be determined by, for example, matching against the edges of the road. Other features that could be matched against to determine vehicle location may include, for example, an overhead sign 1140 and a barrier/wall 1130.

Figure 12:
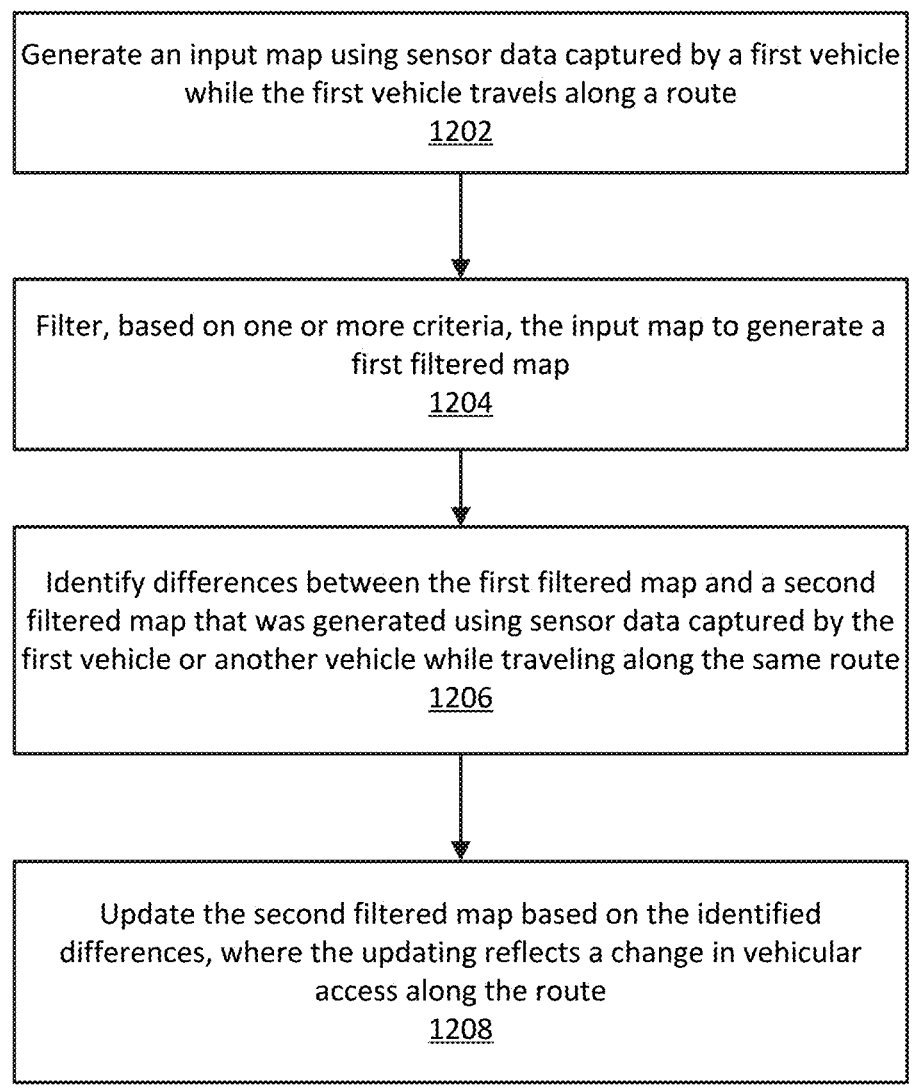
FIG. 12 is a flowchart of a process for updating a filtered map, according to an embodiment.

FIG. 12 is a flowchart of a process 1200 for updating a filtered map, according to an embodiment. The process 1200 can be performed by one or more processors of a computer system with access to a filtered map, such as computer system 150. The process 1200 is described as being performed by the same computer system that generates the filtered map. However, the updating can be performed by a separate computer system. At 1202, the computer system generates an input map using sensor data captured by one or more sensors of a first vehicle while the first vehicle travels along a route.

At 1204, the computer system filters the input map based on one or more criteria to generate a first filtered map. The functionality in 1202 and 1204 can be implemented using the processing described in connection with blocks 702 and 704 of FIG. 7. However, unlike the example of FIG. 7, the first filtered map in 1204 is used to update an existing map, not as an initial instance of a map. The existing map is a second filtered map that was generated in a similar manner as the first filtered map, using sensor data captured by the first vehicle or another vehicle while traveling along the same route. Thus, the first filtered map and the second filtered map at least partially overlap with respect to the geographic area covered. However, the first filtered map can cover a larger or smaller area than that covered by the second filtered map. For example, if the second filtered map is the filtered map 1000 in FIG. 10A, the first filtered map may cover only a few tiles (e.g., region 1020) or even a portion of a single tile.

At 1206, the computer system identifies differences between the first filtered map and the second filtered map. Identifying differences may involve comparing points or features in the first filtered map to corresponding points or features in the second filtered map. This can be performed in a similar manner to the matching that is performed as part of determining vehicle location. The comparison enables the computer system to identify an area that is represented in both the first filtered map and the second filtered map. Further, the comparison enables the computer system to determine the extent to which this common/overlapping area has changed from the time of the second filtered map to the time of the first filtered map.

At 1208, the computer system updates the second filtered map based on the differences identified in 1206. Not all differences are significant enough to warrant updating of the second filtered map. Instead, the computer system may be configured to update the second filtered map to reflect only changes in vehicular access along the route. Examples of changes in vehicular access include blockage of a road (e.g., a barrier that limits access or a lane diversion marked by traffic cones), detours (closure of a highway entrance or exit during a particular time of day), and changes in road shape (e.g., widening or narrowing of a road or addition of a new road segment). In some instances, the computer system may automatically update the second filtered map, for example, by adding or removing points in accordance with point cloud data contained in the first filtered map. However, some types of updates may benefit from manual review before being made. For example, a human reviewer could confirm that two lanes have been merged due to construction work, that a highway entrance is closed between certain hours listed on a traffic sign, etc. The computer system can flag differences between the first filtered map and the second filtered map for manual review, for example, by displaying corresponding portions of the first filtered map and the second filtered map side-by-side.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for generating a map, the method comprising:
generating, by a computer system and based on sensor data captured by a first sensor of a first vehicle, an input map corresponding to a three-dimensional representation of a route traveled by the first vehicle;
detecting, by the computer system, objects represented in the sensor data, wherein the detecting comprises assigning a corresponding class label to features associated with the same object, each class label being selected from a set of predefined object classes;
generating, by the computer system, a bounding box around each detected object;
filtering, by the computer system and based on one or more criteria, the input map to generate a filtered map, wherein:
the filtering comprises automatically removing features that satisfy the one or more criteria,
the one or more criteria identify objects that are irrelevant to determining a location of a second vehicle with reference to the filtered map, and
the one or more criteria comprise at least one object class such that at least some features are removed based on having been assigned a class label corresponding to the at least one object class and further based on belonging to the same bounding box; and
transmitting, by the computer system, the filtered map to the second vehicle, wherein the filtered map is processed by a navigation system of the second vehicle to determine a location of the second vehicle while the second vehicle is traveling along the same route.

2. The method of claim 1, wherein the at least one object class comprises at least one of vehicles, pedestrians, animals, or plants.

3. The method of claim 1, wherein the one or more criteria comprise at least one attribute of an object to be removed, the at least one attribute including at least one of age, length, width, height, speed, or shape.

4. The method of claim 1, wherein the one or more criteria comprise a distance from the first vehicle, the distance being a threshold distance beyond which features are to be removed.

5. The method of claim 1, wherein the filtered map indicates edges of a multi-lane road along the route, and wherein the filtered map excludes lanes within the multi-lane road.

6. The method of claim 1, wherein the first sensor is a LIDAR sensor, wherein the input map comprises a point cloud captured by the LIDAR sensor, and wherein the filtering comprises removing points that satisfy the one or more criteria.

7. The method of claim 6, wherein detecting objects represented in the sensor data further comprises:
identifying features belonging to the same object using the point cloud together with additional sensor data captured by a second sensor of the first vehicle, wherein the additional sensor data is captured contemporaneously with the point cloud, and wherein the second sensor is a camera, a radar sensor, or another LIDAR sensor.

8. The method of claim 7, wherein the second sensor is a camera, and wherein generating a bounding box around each detected object comprises:
determining two-dimensional boundaries of objects in an image captured by the camera; and
mapping the two-dimensional boundaries to corresponding regions of the point cloud to form three-dimensional bounding boxes around points in the point cloud.

9. The method of claim 1, wherein the filtering comprises:
performing a first filtering operation in which features corresponding to ground reflections and moving objects are removed from the input map, the moving objects being removed through point motion classification; and
performing a second filtering operation after the first filtering operation, the second filtering operation removing features that have been assigned a class label corresponding to the at least one object class.

10. The method of claim 1, wherein the filtered map is transmitted to the second vehicle through a wireless connection while the second vehicle is traveling along the same route, and wherein to determine the location of the second vehicle, features included in the filtered map are matched to corresponding features in sensor data captured by a sensor of the second vehicle.

11. A system comprising:
one or more processors; and
a memory storing instructions that, when executed by the one or more processors, cause the one or more processors to:
generate, based on sensor data captured by a first sensor of a first vehicle, an input map corresponding to a three-dimensional representation of a route traveled by the first vehicle;
detect objects represented in the sensor data, wherein the one or more processors are configured to detect objects through assigning a corresponding class label to features associated with the same object, each class label being selected from a set of predefined object classes;
generate a bounding box around each detected object;
filter, based on one or more criteria, the input map to generate a filtered map, wherein:
to filter the input map the one or more processors are configured to automatically remove features that satisfy the one or more criteria,
the one or more criteria identify objects that are irrelevant to determining a location of a second vehicle with reference to the filtered map, and
the one or more criteria comprise at least one object class such that at least some features are removed based on having been assigned a class label corresponding to the at least one object class and further based on belonging to the same bounding box; and
transmit the filtered map to the second vehicle, wherein the filtered map is usable by a navigation system of the second vehicle to determine a location of the second vehicle while the second vehicle is traveling along the same route.

12. The system of claim 11, wherein the at least one object class comprises at least one of vehicles, pedestrians, animals, or plants.

13. The system of claim 11, wherein the one or more criteria comprise at least one attribute of an object to be removed, the at least one attribute including at least one of age, length, width, height, speed, or shape.

14. The system of claim 11, wherein the one or more criteria comprise a distance from the first vehicle, the distance being a threshold distance beyond which features are to be removed.

15. The system of claim 11, wherein the filtered map indicates edges of a multi-lane road along the route, and wherein the filtered map excludes lanes within the multi-lane road.

16. The system of claim 11, wherein:
the first sensor is a LIDAR sensor;
the input map comprises a point cloud captured by the LIDAR sensor;
the one or more processors are configured to identify features belonging to the same object using the point cloud together with additional sensor data captured by a second sensor of the first vehicle;
the additional sensor data is captured contemporaneously with the point cloud captured by the LIDAR sensor; and
the second sensor is a camera, a radar sensor, or another LIDAR sensor.

17. The system of claim 16, wherein the second sensor is a camera, and wherein to generate a bounding box around each detected object, the one or more processors are configured to:
determine two-dimensional boundaries of objects in an image captured by the camera; and
map the two-dimensional boundaries to corresponding regions of the point cloud to form three-dimensional bounding boxes around points in the point cloud.

18. The system of claim 11, wherein to filter the input map, the one or more processors are configured to:
perform a first filtering operation in which features corresponding to ground reflections and moving objects are removed from the input map, the moving objects being removed through point motion classification; and
perform a second filtering operation after the first filtering operation, the second filtering operation removing features that have been assigned a class label corresponding to the at least one object class.

19. The system of claim 11, wherein the filtered map is transmitted to the second vehicle through a wireless connection while the second vehicle is traveling along the same route, and wherein the navigation system of the second vehicle is configured to determine the location of the second vehicle through matching features included in the filtered map to corresponding features in sensor data captured by a sensor of the second vehicle.

20. A non-transitory computer-readable storage medium storing instructions that, when executed by one or more processors of a computer system, cause the one or more processors to perform the following:
generating, based on sensor data captured by a first sensor of a first vehicle, an input map corresponding to a three-dimensional representation of a route traveled by the first vehicle;
detecting, by the computer system, objects represented in the sensor data, wherein the detecting comprises assigning a corresponding class label to features associated with the same object, each class label being selected from a set of predefined object classes;
generating, by the computer system, a bounding box around each detected object;
filtering, based on one or more criteria, the input map to generate a filtered map, wherein:
the filtering comprises automatically removing features that satisfy the one or more criteria,
the one or more criteria identify objects that are irrelevant to determining a location of a second vehicle with reference to the filtered map, and
the one or more criteria comprise at least one object class such that at least some features are removed based on having been assigned a class label corresponding to the at least one object class and further based on belonging to the same bounding box; and
transmitting the filtered map to the second vehicle, wherein the filtered map is usable by a navigation system of the second vehicle to determine a location of the second vehicle while the second vehicle is traveling along the same route.

* * * * *